United States Patent
Gotoh et al.

[11] Patent Number: 5,956,045
[45] Date of Patent: Sep. 21, 1999

[54] COORDINATE DATA INPUT SYSTEM AND METHOD

[75] Inventors: Kazuhiro Gotoh, Machida; Seida Iida, Yokohama, both of Japan

[73] Assignee: International Business Machines Corporation, Armonk, N.Y.

[21] Appl. No.: 08/734,588

[22] Filed: Oct. 22, 1996

[30] Foreign Application Priority Data

Jan. 18, 1996 [JP] Japan ................................ 8-006891

[51] Int. Cl.[6] .................................................. G06T 17/40
[52] U.S. Cl. .......................... 345/437; 345/145; 345/156; 345/162; 345/157
[58] Field of Search .................... 345/145, 156, 345/157, 162, 173, 437

[56] References Cited

U.S. PATENT DOCUMENTS

| | | | |
|---|---|---|---|
| 4,754,269 | 6/1988 | Kishi et al. | 345/437 |
| 4,887,230 | 12/1989 | Noguchi et al. | 345/157 |
| 5,019,809 | 5/1991 | Chen | 345/157 |
| 5,588,097 | 12/1996 | Ono et al. | 395/137 |
| 5,588,098 | 12/1996 | Chen et al. | 395/137 |
| 5,734,377 | 3/1998 | Fukuzaki | 345/173 |

*Primary Examiner*—Mark K. Zimmerman
*Assistant Examiner*—Vincent E. Kovalick
*Attorney, Agent, or Firm*—Daniel E. McConnell; Bernard D. Bogdon

[57] ABSTRACT

A coordinate input system to which control data (a displacement value), concerning the location and the posture of a displayed graphic object, can be input with a conventional coordinate pointing device, such as a mouse, and a method therefor. Coordinate values of three sequential input points $P_n$, $P_{n+1}$ and $P_{n+2}$, which are entered with a coordinate pointing device, such as a mouse, are employed to calculate the central angle $\angle P_n O_n P_{n+2}$ relative to the arc $P_n P_{n+1} P_{n+2}$ of the circle $O_n$ circumscribed about these three points. Then, the angle $\angle P_n O_n P_{n+2}$ is employed to acquire the central angle $\angle \theta_n$ for the arc $P_n P_{n+1}$. A logic circuit or an upper-level program that waits for the input of the dial rotation value as control data employs the central angle $\angle \theta_n$, which is acquired by inputting the coordinate values of the two sequential points $P_n$ and $P_{n+1}$, to rotate a graphic model around a designated axis on a screen in accordance with the angle $\angle \theta_n$.

14 Claims, 15 Drawing Sheets

$$\overrightarrow{P_nP_{n+1}} = \vec{a} = (x_1, y_1)$$
$$\overrightarrow{P_nP_{n+2}} = \vec{b} = (x_2, y_2)$$
$$\overrightarrow{P_nP'_{n+1}} = \vec{a'} = (y_1, -x_1)$$

(A) $\angle \phi < 90°$ (B) $\angle \phi \geq 90°$

[EXPRESSION 1]

$$\vec{a'} \cdot \vec{b} = |\vec{a'}||\vec{b}|\cos(90° - \delta) \qquad \ldots (1)$$

[EXPRESSION 2]

$$\cos\angle\phi = \frac{m^2 - l^2 - k^2}{2lk} \qquad \ldots (2)$$

[EXPRESSION 3]

$$\angle 2\psi = \angle\theta n + \angle\theta n' \qquad \ldots (3)$$

[EXPRESSION 4]

$$\frac{k}{\angle\theta n} \doteqdot \frac{l}{\angle\theta n'} \qquad \ldots (4)$$

[EXPRESSION 5]

$$\angle(\theta n)ave = \frac{\angle\theta n \times 8 + \angle\theta_{n-1} \times 4 + \angle\theta_{n-2} \times 2 + \angle\theta_{n-3}}{8 + 4 + 2 + 1}$$

$$\ldots (5)$$

|  | $P_n$ | $P_{n-1}$ | $P_{n-2}$ | $P_{n-3}$ |
|---|---|---|---|---|
| X | 0 | 0 | 0 | 0 |
| Y | 0 | 0 | 0 | 0 |
| $\angle\theta$ | 0 | 0 | 0 | 0 |

-INITIAL STATE-

TABLE 1

|  | $P_n$ | $P_{n-1}$ | $P_{n-2}$ | $P_{n-3}$ |
|---|---|---|---|---|
| X | 799 | 0 | 0 | 0 |
| Y | 456 | 0 | 0 | 0 |
| $\angle\theta$ | 0 | 0 | 0 | 0 |

-STATE 1-

TABLE 2

|  | $P_n$ | $P_{n-1}$ | $P_{n-2}$ | $P_{n-3}$ |
|---|---|---|---|---|
| X | 797 | 799 | 0 | 0 |
| Y | 456 | 456 | 0 | 0 |
| $\angle\theta$ | 0 | 0 | 0 | 0 |

-STATE 2-

TABLE 3

|   | $P_n$ | $P_{n-1}$ | $P_{n-2}$ | $P_{n-3}$ |
|---|---|---|---|---|
| X | 790 | 797 | 799 | 0 |
| Y | 450 | 456 | 450 | 0 |
| $\angle\theta$ | 8 | 0 | 0 | 0 |

-STATE 3-

TABLE 4

|   | $P_n$ | $P_{n-1}$ | $P_{n-2}$ | $P_{n-3}$ |
|---|---|---|---|---|
| X | 780 | 790 | 797 | 799 |
| Y | 438 | 450 | 456 | 456 |
| $\angle\theta$ | 14 | 8 | 0 | 0 |

-STATE 4-

TABLE 5

|   | $P_n$ | $P_{n-1}$ | $P_{n-2}$ | $P_{n-3}$ |
|---|---|---|---|---|
| X | 776 | 780 | 790 | 797 |
| Y | 425 | 438 | 450 | 456 |
| $\angle\theta$ | 22 | 14 | 8 | 0 |

-STATE 5-

TABLE 6

LATEST INPUT
COORDINATE VALUE:

$X = 532$ $Y = 450$

| 532 | 0 | 0 | 0 |
|---|---|---|---|
| 450 | 0 | 0 | 0 |
| 0 | 0 | 0 | 0 |

ROTATION ANGLE:

$\angle(\theta n)ave$ $=0$

TABLE 7

LATEST INPUT
COORDINATE VALUE:

$X = 532$ $Y = 450$

| 532 | 532 | 0 | 0 |
|---|---|---|---|
| 450 | 450 | 0 | 0 |
| 0 | 0 | 0 | 0 |

ROTATION ANGLE:

$\angle(\theta n)ave$ $=0$

TABLE 8

LATEST INPUT
COORDINATE VALUE:

$X = 533$ $Y = 450$

| 533 | 532 | 532 | 0 |
|---|---|---|---|
| 450 | 450 | 450 | 0 |
| 1 | 0 | 0 | 0 |

ROTATION ANGLE:

$\angle(\theta n)ave$ $=0$

TABLE 9

LATEST INPUT
COORDINATE VALUE:

$X = 543$ $Y = 450$

| 543 | 533 | 532 | 532 |
|---|---|---|---|
| 450 | 450 | 450 | 450 |
| 10 | 1 | 0 | 0 |

ROTATION ANGLE:

$\angle(\theta n)ave$ $=5$

TABLE 10

| LATEST INPUT COORDINATE VALUE: | 560 | 543 | 533 | 532 | ROTATION ANGLE: |
|---|---|---|---|---|---|
| $X = 560$ | 450 | 450 | 450 | 450 | $\angle(\theta n)ave$ |
| $Y = 450$ | 17 | 10 | 1 | 0 | $=11$ |

TABLE 11

| LATEST INPUT COORDINATE VALUE: | 588 | 560 | 543 | 533 | ROTATION ANGLE: |
|---|---|---|---|---|---|
| $X = 588$ | 450 | 450 | 450 | 450 | $\angle(\theta n)ave$ |
| $Y = 450$ | 28 | 17 | 10 | 1 | $=19$ |

TABLE 12

| $n$ | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $\angle \theta n$ | -28 | -30 | -13 | -25 | -29 | -21 | -28 | 0 | 19 | 22 | 27 | 19 | 26 | 23 |
| $\angle(\theta n)ave$ | -16 | -24 | -19 | -22 | -25 | -23 | -26 | -12 | 5 | 14 | 22 | 21 | 24 | 23 |

TABLE 13

COORDINATE DATA INPUT SYSTEM AND METHOD

BACKGROUND OF THE INVENTION

The present invention relates to a coordinate data input system for computer graphics (especially, a three-dimensional graphics) and a method therefor; and in particular, a coordinate input system for controlling the location and the posture of a displayed graphic model, and a method therefor. More specifically, the present invention pertains to a coordinate data input system that can use a conventional coordinate pointing device, such as a mouse to input control data (displacement value) concerning the location and the posture of a displayed graphic model, and to a method therefor.

In accordance with recent technical developments, there has been an increase in the fields for which computer systems are employed. The creation of graphics and images and the use of computers to process them is one example. The techniques employed for graphic processing have become more important in CAD/CAM as employed in science, engineering, manufacturing, and other fields, and in the development of various software programs.

In the graphic processing field, particularly in the three dimensional graphic processing field, the ability to rotate and translate a displayed object (i.e., control the location and the posture of the object) on a screen is in high demand. A three-dimensional graphic system, therefore, in addition to a so-called computer system main body, generally further includes a graphics display device and an instruction input device for inputting the location and the posture of an object. It is preferable that the computer system, as well as, for example, a graphic workstation, have a high speed CPU, a large capacity memory, a high speed video adaptor, and a DASD (Direct Access Storage Device; e.g., a hard disk) that has a large memory capacity. Further, it is desirable that the graphics display device have a bit-mapped display with a high resolution of 1000 1000 dots or higher. Further, since the location and the posture of the three-dimensional object has six degrees of freedom, which are three axial directions xyz and rotational directions around the individual axis, preferably, the input device has at least six dimensional input mechanisms. In addition, a degree of freedom for the enlargement/reduction of the object on a screen is required.

For example, an "IBM 5085/86" (hereinafter referred to as a 5085/86") is an input/output terminal, for a graphics application programs activated by a host mainframe. The 5085/86 has an excellent display function, especially for graphics, and can process and display a graphic model at high speed, and has, as standard features, input devices, such as a dial, a tablet and a keyboard, that are easily manipulated.

"6094 Dials Model 010" (hereinafter referred to as a hardware dial), sold by IBM Corp., is the most typical example of an instruction input device that can be used for the IBM 5085/86. The hardware dial is a rotary input device that has eight dials, as is shown in FIG. 13. The individual dials of the hardware dial are assigned for the position of an object in xyz axial directions, rotation around the respective axes, and size enlargement/reduction control. Since each dial has a conical shape, an operator can easily input a relatively great displacement value by rotating the distal tapered portion of the dial, and can input a small displacement value by rotating the large base portion of the dial. While the hardware dial provides excellent operability, it is very expensive. For a high-end user who can afford to purchase a relatively expensive graphics terminal, such as the IBM 5085/86, the price of the hardware dial may not be a big matter; but for a user who employs a terminal emulation program instead of such a graphic terminal, the price of the hardware dial is too high to be disregarded. "IBM Soft5080 for AIX" (hereinafter referred to as a "5080 emulation"), sold by IBM Japan Co., Ltd., is a program for emulating the IBM 5085/86 graphics terminal on a general-purpose computer system, e.g., an RS/6000 ("RS/6000" is a trademark of IBM Corp.)(It should be noted that a graphics adaptor must be mounted in the computer system, and AIX ("AIX" is a trademark of IBM Corp.) must be installed as the operating system.). The 5080 emulation provides the functions of the 5085/86 terminal in the AIX-Window environment by emulating almost all the functions, such as channel command processing for an application program (e.g., CADAM or CATIA) operated by a host mainframe, the execution of a graphic display program, and input by a user with a hardware dial or at a keyboard. Various software tools, to include "software dials", are packaged together with the 5080 emulation and for sale on the market. Software dials is an application program for emulating the functions of the hardware dials with dials displayed in a window on a screen, and is also a tool for emulating the functions of the hardware dials by using a pointing device, such as a mouse, that is available at a relatively low price and is widely used.

In FIG. 14 is shown a display panel for software dials. As is shown, on the screen software dials occupy one window constituted by a title bar at the top, a menu bar below it, and eight software dials intended to imitate the hardware dials. Two buttons are displayed next to each dial, one on either side, for inputting the rotation of the dial in the clockwise and the counterclockwise direction. Inside the circle representing each software dial is a position indicator for displaying a current indicated value. To manipulate software dials, either the left button or the right button of a software dial allocated for a desired degree of freedom (e.g., the rotation around the x axis and the translating along the x axis) is pointed at and clicked as needed. The clicking of the left or the right button with a mouse emulates as an instruction of the counterclockwise rotation or the clockwise rotation of a hardware dial. The input rotation value may be proportional to the number of clicks or the duration of the depression of the mouse button. The position indicator within the circle of the dial updates the rotational location in accordance with the instructed dial rotation value. The rotation distance for each click, or the rotation distance for each measured time period a button is depressed, may be a default value or a user programmable value.

Software dials shown in FIG. 14 emulate as closely as possible the images and functions of the hardware dials, which are rotary input hardware devices, and an operator can use them intuitively. However, since in such software emulation, almost all the input manipulations are realized by clicking with a mouse button, there is a certain gap between such manipulation and manipulations that involve hardware use, and several difficulties exist related to the input of a rotation instruction and the translating of an object.

For example, a CAD/CAM operator tends to gradually translate from the rough rotation and movement of a graphic model to the delicate control of the graphic model, e.g., from a large movement of the model to a small movement. When an operator uses a hardware dial, which is conically shaped, he or she rotates the distal tapered portion of the dial to input a relatively great displacement, or rotates the large base portion to input a fine displacement. When the operator employs software dials, the dial rotation value is proportional to the number of clicks with the left/right button, or to the duration of the depression of the button. The constant of proportionality is fixed during the input manipulation, regardless of whether it is a default value or a user programmable value. Thus, the rotation value or the translate value of a graphic model for each manipulation with a mouse is uniform, and the moderate rotation and translating involving the use of hardware dials can not be emulated. Even when the constant of proportionality is user programmable, it is fixedly employed once it is set, and moderate input operation can not be realized.

SUMMARY OF THE INVENTION

It is therefore one purpose of the present invention to provide an excellent coordinate input system for a graphic process, especially, a three-dimensional graphic process, for use on a computer, and a method therefor.

It is another purpose of the present invention to provide an excellent coordinate input system for controlling the location and the posture of a displayed graphic object, and a method therefor.

It is an additional purpose of the present invention to provide an excellent coordinate input system to which control data (a displacement value), concerning the location and the posture of a displayed graphic object, can be input without requiring the expansion of a special hardware component, and a method therefor.

It is a further purpose of the present invention to provide an excellent coordinate input system to which control data (a displacement value), concerning the location and the posture of a displayed graphic object, can be input with an ordinary coordinate pointing device, such as a mouse, and a method therefor.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENTS

Figure 1:
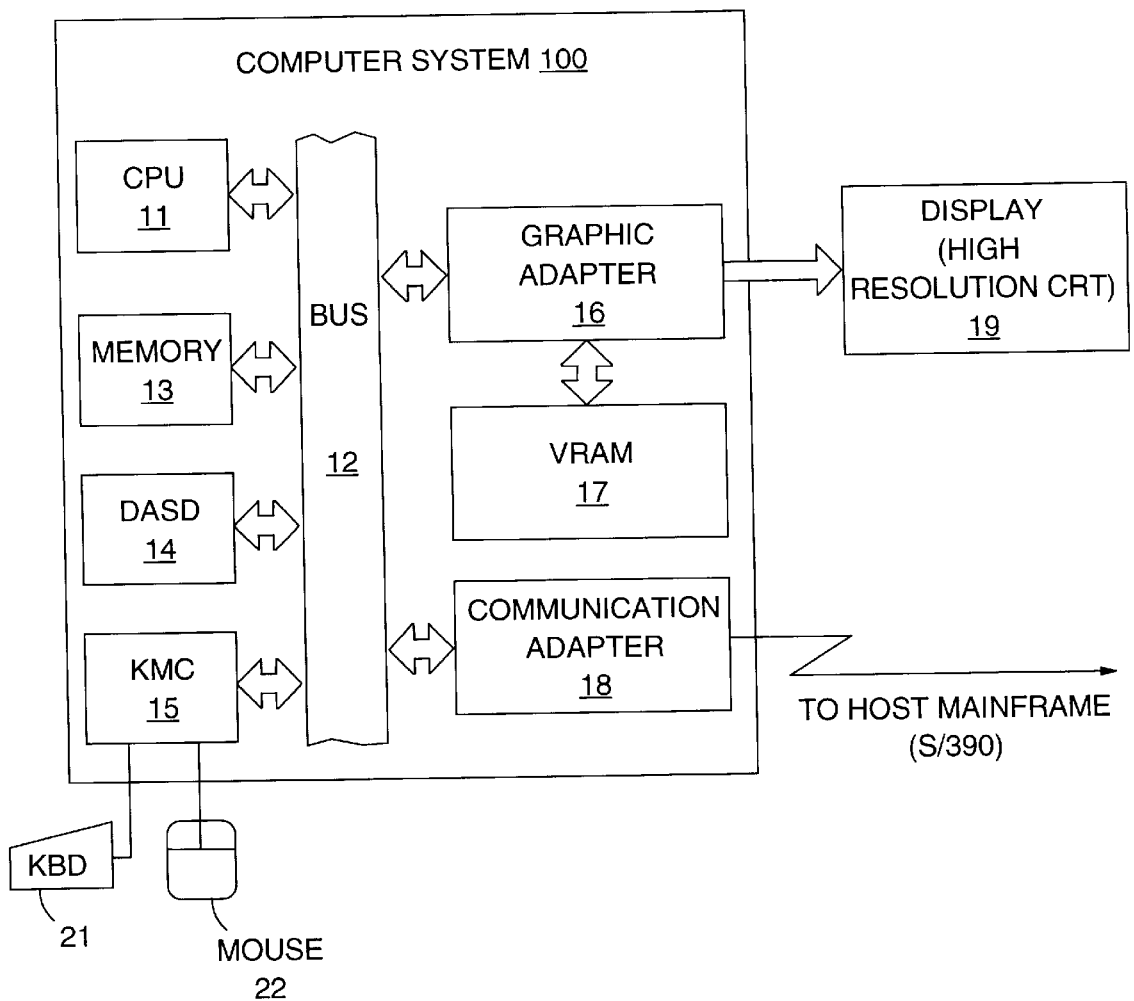
FIG. 1 is a schematic diagram illustrating the arrangement of a computer system 100 employed for one embodiment of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the above purposes, according to a first aspect of the present invention, a coordinate input system for acquiring a control data indicating a location and a posture of a graphic model displayed on a screen by employing a coordinate value entered with a coordinate pointing device, comprises: (a) memory storing data to be processed, the memory including a coordinate value of an input point $P_i(x_i, y_i)$ that is sequentially input by the coordinate pointing device (subscript "i" is a positive integer and indicates an input count); (b) first means for calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, Y_{n+1})$ and $P_{n+2}(X_{n+2}, y_{n+2})$, the coordinate value of the three sequential input points $P_n(x_n, y_n)$, $P_{n+1}(x_{n+1}, y_{n+1})$ and $P_{n+2}(x_{n+2}, y_{n+2})$ being stored in the memory (n is a positive integer); (c) second means for calculating a rotation angle $\angle \theta_n (=\angle P_n O_n P_{+1})$, which is indicated by the two sequential input points $P_n(x_n, y_n)$ and $P_{n+1}(x_{n+1}, y_{n+1})$, in accordance with the central angle $\angle P_n O_n P_{n+2}$; and (d) third means for employing the calculated rotation angle $\angle \theta_n$ as a control data.

According to a second aspect of the present invention, a coordinate input system for acquiring a control data indicating a location and a posture of a graphic model displayed on a screen by employing a coordinate value that is entered with a coordinate pointing device, comprises: (a) memory storing data to be processed, the memory including a coordinate value of an input point $Pi(x_i, y_i)$ that is sequentially input by the coordinate pointing device (subscript "i" is a positive integer and indicates the number of inputs); (b) first means for calculating a central angle $\angle P_n O_n P_{n+2}$ relative to an arc $P_n P_{n+1} P_{n+2}$ of a circle $_n O$ circumscribed about three sequential input points $P_n(x_n, y_n)$, $P_{n+1}(x_{n+1}, y_{n+1})$ and $P_{n+2}(x_{n+2}, y_{n+2})$, the coordinate value of the three sequential input points $P_n(x_n, y_n)$, $P_{n+1}(x_{n+1}, y_{n+1})$ and $P_{n+2}(x_{n+2}, y_{n+2})$ being stored in the memory (n is a positive integer); (c) second means for calculating a rotation angle $\angle \theta_n (= \angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$; (d) third means for calculating a weighted average for the rotation angle $\angle \theta_n$ and one or more previously obtained rotation angles, $\angle \theta_{n-1}$ ($=\angle P_{-1} O_{n-1} P_n$), $\angle \theta_{n-2} (=\angle P_{n-2} O_{n-2} P_{n-1})$, . . . ; and (e) fourth means for employing the averaged rotation angle $\angle (\theta_n)_{ave}$ as a control data.

According to a third aspect of the present invention, a coordinate input system for acquiring a rotation value as control data by employing a coordinate value entered with a coordinate pointing device, comprises: (a) memory storing data to be processed, the memory including a coordinate value of an input point $P_i$ that is sequentially input by the coordinate pointing device (subscript "i" is a positive integer and indicates the number of inputs); (b) first means for calculating a central angle $\angle P_n O_n P_{n+2}$ relative to an arc $P_n P_{n+1} P_{n+2}$ of a circle $O_n$ circumscribed about three sequential input points $P_n$, $P_{n+1}$ and $P_{n+}$the coordinate value of the three sequential input points $P_n$, $P_{n+1}$ and $P_{n+2}$ being stored in the memory; (c) second means for calculating a rotation angle $\angle \theta_n$ relative to an arc $P_n P_{n+1}$ of the circle $O_n$; and (d) third means for employing the calculated rotation angle $\angle \theta_n$ as a control data.

According to a fourth aspect of the present invention, a coordinate input method for acquiring a control data concerning a location and a posture of a graphic model displayed on a screen by employing a coordinate value entered with a coordinate pointing device, comprises: (a) a first step of sequentially storing a coordinate value of an input point $P_i(x_i, y_i)$ entered by the coordinate pointing device (subscript "i" is a positive integer and indicates the number of inputs); (b) a second step of calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{+1}(x_{n+1}, y_{n+1})$ and $P_{n+2}(x_{n+2}, y_{n+2})$ (n is a positive integer); (c) a third step of calculating a rotation angle $\angle \theta_n (=\angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$; and (d) a fourth step of employing the calculated rotation angle $\angle \theta_n$ as a control data.

According to a fifth aspect of the present invention, a coordinate input method for acquiring a control data concerning a location and a posture of a graphic model displayed on a screen by employing a coordinate value entered with a coordinate pointing device, comprises: (a) a first step of sequentially storing a coordinate value of an input point $P_i(x_i, y_i)$ entered by the coordinate pointing device (subscript "i" is a positive integer and indicates the number of inputs); (b) a second step of calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+2})$ (n is a positive integer); (c) a third step of calculating a rotation angle $\angle \theta_n (=\angle P_n O_n P_{n+1})$, which is indicated by the two sequential input point $P_n(x_n, y_n)$ and $P_{n+1}(x_{n+1}, y_{n+1})$, in accordance with the central angle $\angle P_n O_n P_{n+2}$; (d) a fourth step of calculating a weighted average for the rotation angle $\angle \theta_n$, and one or more previously obtained rotation angles, $\angle \theta_{n-1}$ ($=\angle P_{n-1} O_{n-1} P_n$), $\angle \theta_{n-2} (=\angle P_{n-2} O_{n-2} P_{n-1})$, . . . ; and (e) a fifth step of employing the averaged rotation angle $\angle (\theta_n)_{ave}$ as a control data.

According to a sixth aspect of the present invention, a coordinate input method for acquiring a rotation value as control data by employing a coordinate value entered with a coordinate pointing device, comprises: (a) a first step of sequentially storing a coordinate value of an input point $P_i$ that is sequentially input by the coordinate pointing device (subscript "i" is a positive integer and indicates the number of inputs); (b) a second step of calculating a central angle $\angle P_n O_n P_{n+2}$ relative to an arc $\angle P_n P_{n+1} P_{n+2}$ of a circle $O_n$ circumscribed about three sequential points $P_n$, $P_{n+1}$ and $P_{+2}$; (c) a third step of calculating a rotation angle $\angle \theta_n$ relative to an arc $P_n P_{n+1}$ of the circle $O_n$; and (d) a fourth step of employing the rotation angle $\angle \theta_n$ as a control data.

According to the coordinate input system and the method therefor of the present invention, coordinate values of three sequential input points $P_n$, $P_{n+1}$ and $P_{n+2}$ entered with a conventional coordinate pointing device, such as a mouse, are employed to calculate the central angle $\angle P_n O_n P_{n+2}$ relative to the arc $\angle P_n P_{n+1} P_{n+2}$ of the circle $O_n$, which is circumscribed about these three points. The law of cosines, for example, is used to acquire the angle $\angle P_n O_n P_{n+2}$ as described hereinafter. Then, the angle $\angle P_n O_n P_{n+2}$ is employed to acquire the central angle $\angle \theta_n$ for the arc $P_n P_{n+1}$. The angle $\angle \theta_n$ is obtained by a relatively easy geometric calculation (see FIGS. 8 through 11 and the related description which follows hereinafter). A logic circuit or an upper-level program that waits for the input of the dial rotation value as control data employs the central angle $\angle \theta_n$ as a rotation value, which is acquired by inputting the coordinate values of the two sequential input points $P_n$ and $P_{n+1}$. The logical circuit or the upper-level program rotates a graphic model around a designated axis on a screen in accordance with the angle $\angle \theta_n$, and also rotates the position indicator for software dial in accordance with the angle $\angle \theta_n$. In other words, according to the present invention, an arc equivalent to a desired dial rotation value need only be drawn by using a conventional coordinate pointing device, such as a mouse. Accordingly, a special device, such as a hardware dial, is not required.

To describe the present invention precisely, it is an intuitive method whereby a dial rotation value is emulated by a rotation angle represented by the locus of a mouse pointer. However, this method still carries with it several problems. A pointing device such as a mouse is based on the input of a coordinate value on an xy plane, not on a rotation value, and thus, a difference between the sensation of using a pointing device and of using a hardware dial remains. Even when, for example, an operator intends to draw a smooth curve with a mouse, coordinate values obtained by sampling are discontinuous and are located in zigzag fashion. This zigzag input may be caused by the unskillful manipulation of the hand of the operator, and may be induced by friction of the track ball of a mouse or by the surface roughness of a mouse operation plate. If a graphic model, or a graphic image provided by software dial is updated using such zigzag input, the graphic image will be rotated awkwardly or moved. Such stiff movements cause an operator to feel uncomfortable and a loss in usability.

According to the second and the fifth aspect of the present invention, the rotation angle $\angle \theta_n$, obtained by using the three sequential input coordinate values, is employed with one or more previously acquired rotation angles, $\angle \theta_{n-1}$ ($=\angle P_{n-1} O_{n-1} P_n$) $\angle \theta_{n-2}$ ($=P_{n-2} O_{n-2} P_{n-1}$), . . . to calculate a weighted average for the smoothing of the zigzag input.

A program (e.g., an X-Server in X-Window) for controlling an input and output function, such as manipulation that involves the use of a mouse, usually samples the coordinate values input by a mouse pointer every 16 msec. The method of the present invention, according to which the track of a mouse pointer is employed by an emulation process to acquire dial rotation values, is based on the fact that only noncontiguous coordinates are input when using a mouse. This is because, to a degree, errors may be included when coordinate values obtained by discrete sampling are used to sequentially acquire the rotation angle for a curve. When, for example, there is no displacement during three sequential input points $P_n(x_n, y_n)$, $P_{n+1}(x_{n+1}, y_{n+1})$ and $P_{n+2}(x_{n+2}, y_{n+2})$, it is assumed that a user does not intend to rotate a dial. If, in spite of that, rotation angle $\angle\theta_n$ is calculated, a meaningless (or useless) rotation angle $\angle\theta_n$ is fetched and a graphic image on a screen is rotated and/or moved contrary to the desire of an operator. In addition, as in a case for the second and, the fifth aspect where a weighted average is acquired for the rotation angle, an erroneous input adversely affects the succeeding process.

To prevent such an inconvenience, when, with the present invention, no substantial displacement exists among the coordinate values for three sequential input points $P_n(x_n, y_n)$, $P_{n+1}(x_{n+1}, y_{n+1})$ and $P_{n+2}(x_{n+2}, y_{n+2})$, a process for acquiring the rotation angle $\angle\theta_n$ is not performed and control data is set to zero.

Since the hardware dial has a degree of freedom for rotation along only one axis, an erroneous operation rarely occurs. On the other hand, as there is no restriction on using a mouse for the xy plane operation, accordingly erroneous operations may occur frequently. A typical example of an erroneous operation is so-called "hand vibration". Hand vibration is perceived as minute reciprocating movements of a mouse that may occur within a short period of time. When, for example, three sequential input points $P_n(x_n, y_n)$, $P_{n+1}(x_{n+1}, y_{n+1})$ and $P_{n+2}(x_{n+2}, y_{n+2})$ indicate an acute angle $\angle P_n P_{n+1} P_{n+2}$, it is assumed to be caused by the vibrating of an operator's hand because it is unbelievable that for a ordinary input operation the mouse pointer would reciprocate in a short time of 100 msec, which is the time required for sampling three points. If a screen display reflects in response to such an erroneous operation, a graphic image on a screen will be rotated and/or moved, or will become difficult to discern. For a case as in the second and the fifth aspects where a weighted average as the rotation angle is acquired, an erroneous input adversely affects the succeeding process.

To prevent such an inconvenience, in the present invention, when the acquired rotation angle $\angle\theta_n$ ($=\angle P_n O_n P_{n+1}$) is an acute angle, a process for acquiring the rotation angle $\angle\theta_n$ ($=\angle P_n O_n P_{n+1}$) is not performed, and control data is set to zero.

Further, some operators feel that it is easier and more intuitive to input a dial rotation value by the linear displacement of a mouse, i.e., the distance the mouse travels, than to instruct a dial rotation value in accordance with the rotation angle of an arc. When an operator desires to operate a software dial to instruct movement along an axis instead of rotation around the axis, the linear displacement of a mouse is appropriate. In the present invention, when three sequential points $P_n(x_n, y_n)$, $P_{n+1}(x_{n+1}, y_{n+1})$ and $P_{n+2}(x_{n+2}, y_{n+2})$ are located almost in a line, a value proportional to the displacement distance between the points $P_n$ and $P_{n+1}$ is employed as the rotation angle $\angle\theta_n$.

FIG. 1 is a schematic block diagram illustrating a computer system 100 employed for one embodiment of the present invention.

In the system 100, a CPU 11, which is a main controller, executes various programs under the control of an operating system (OS). A high-speed RISC CPU, such as a "PowerPC", ("PowerPC" is a trademark of IBM Corp.) can be employed as the CPU 11. The CPU 11 communicates with the individual hardware blocks across a common signal transfer path (also called a "bus") that comprises data signal lines, address signal lines, and control signal lines.

A memory 13 is volatile memory (RAM) in which programs (the OS and application programs that are to be executed by the CPU 11 (see sub-division B) are loaded, and is used as a work area for the CPU 11. A coordinate value sequentially entered with a mouse 22 is temporarily stored in a predetermined area in the memory 13.

A DASD (Direct Access Storage Device) 14 is a so-called auxiliary storage device. A hard disk drive (HDD) and a floppy disk drive (FDD), for example, correspond to this DASD.

A keyboard/mouse controller 15 processes a matrix that is input at a keyboard 21 and a coordinate value pointed by the mouse 22 into a format defined by the OS, and transmits the results to the bus 12. A coordinate value entered with the mouse 22, for example, is temporarily stored in a buffer area at a predetermined address in the memory 13.

A graphics adaptor 16 is a peripheral device for actually processing a drawing command from the CPU 11. The graphics adaptor 16 temporarily writes the processed image data into a screen buffer (VRAM) 17, and then reads the image data from the VRAM 17 and outputs it to a display 19. It should be understood that the graphics function of the graphics adaptor 16 in this embodiment is especially improved one. Further, it should be understood that the display 19 in this embodiment is a high-resolution bit-mapped display (e.g., 1000 1000 dots or greater).

A communication adaptor 18 is a peripheral device for communicating with another independent (remote) device. An Ethernet card or a Token-Ring card, for example, corresponds to this adaptor 18. The system 100 is connected to a host mainframe, e.g., S/390, directly or across a network by the communication adaptor 18.

An example of such a computer system 100 is the RS/6000 in which AIX is installed as an operating system. Although many hardware components other than those shown in FIG. I are required to constitute the computer system 100, as they are well known by one having ordinary skill in the art and are not related to the subject of the present invention, no explanation for them will be given in this specification.

Figure 2:
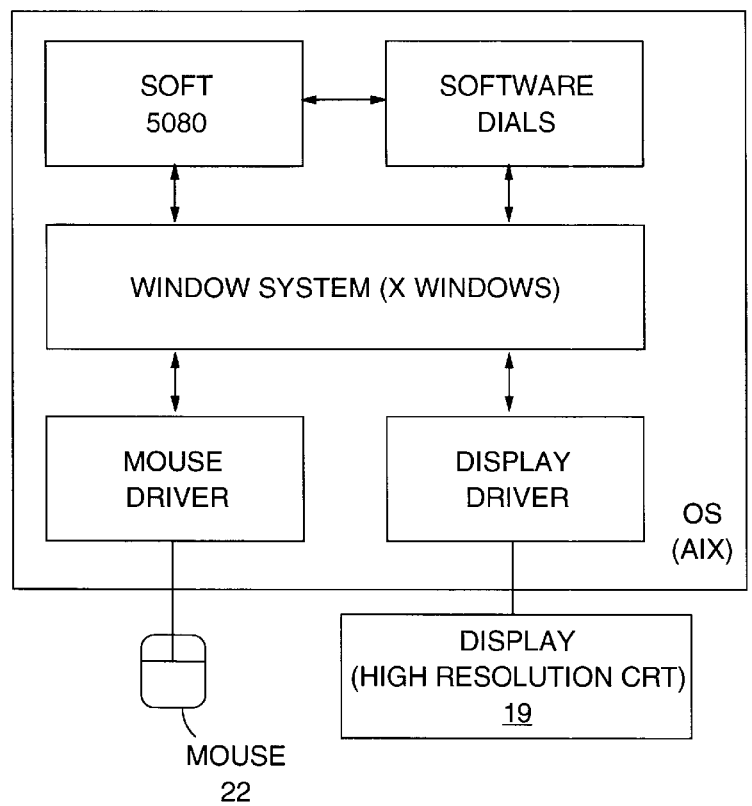
FIG. 2 is a specific diagram illustrating a software environment of the computer system 100 employed for the embodiment of the present invention.

FIG. 2 is a specific diagram illustrating the software environment in the computer system 100 employed for the embodiment of the present invention.

The system 100 executes various programs under the control of a multi-task and multi-user OS, such as AIX.

A mouse driver is a device driver that uses hardware to control input with the mouse 22. A display driver is a device driver that uses hardware to control the display 19 in accordance with the screen control exercised by the OS (especially, the window system).

The window system is a program that performs as the input/output functions, such as displaying and mouse manipulation, and handles communication with an application program. "X-Window" in AIX corresponds to this program. The portion of X-Window that handles the input/output function is specifically called an "XServer".

Soft5080 and software dials are application programs executed in the AIX environment. Soft5080 is a program for emulating an IBM 5085/86 graphic terminal. As is previously described, Soft5080 emulates almost all the functions of the 5085/86 terminal: for example, the processing of a channel command for an application program operated by the host mainframe, the execution of a graphic display program, and the use of a dial and a keyboard for user input. Software dials is an application program for emulating on a screen the functions that are the equivalent of those of the hardware dials, and is a tool for emulating the functions of hardware dials in accordance with coordinate values input with a coordinate pointing device, such as a mouse. It should be noted that software dials in this embodiment has functional and operational characteristics that differ from those described in hereinabove.

Figure 3:
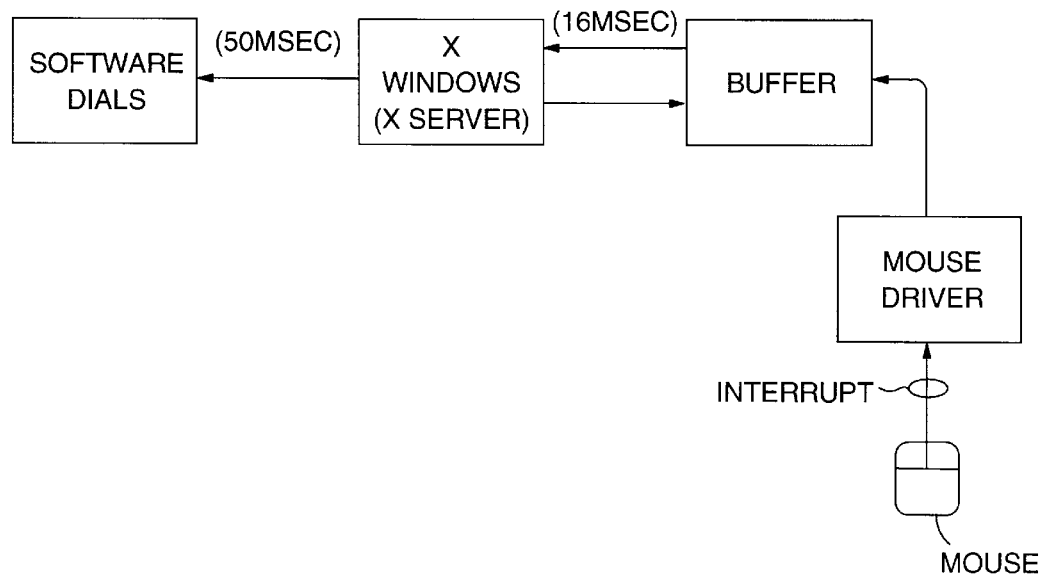
FIG. 3 is a specific diagram showing the exchange of data by programs used for the embodiment of the present invention.

FIG. 3 is a specific diagram showing data exchange between individual programs. The mouse 22, which is one of the hardware components, generates an interrupt request to the system 100 in response to a change in its own state (e.g., movement of the mouse 22 or the depression of a mouse button). The mouse driver handles this interrupt request and writes the contents of the hardware operation, e.g., a new input coordinate value, in a predetermined buffer area. This buffer area can be a work area for the mouse driver in the memory 13. X-Window, more specifically, the X-Server, performs polling of the contents of the buffer every 16 msec, and reports, every 50 msec, the written coordinate value to software dials, which is the upper-level program. The time intervals 16 msec, and 50 msec are merely default values.

Figure 4:
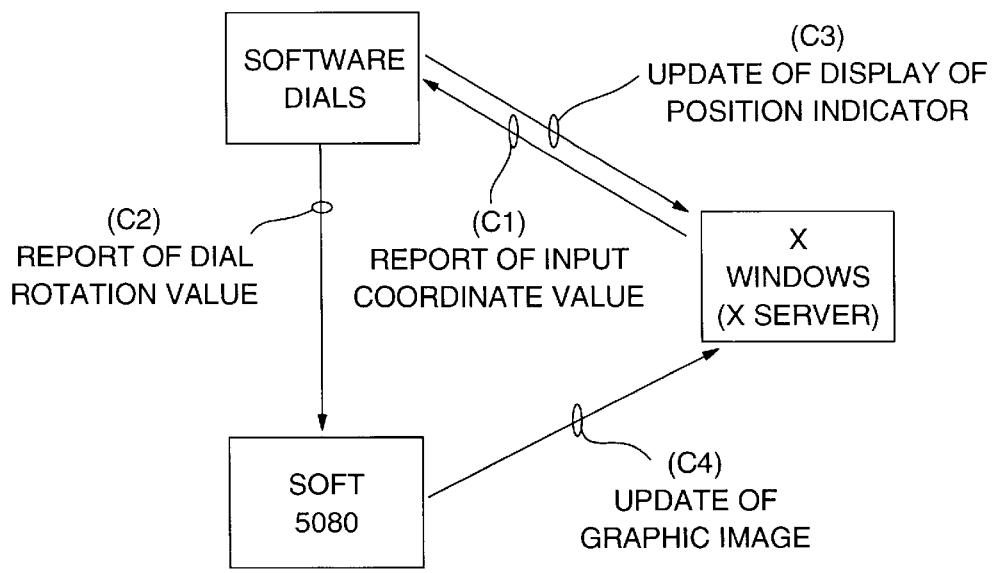
FIG. 4 is a specific diagram showing the exchange of commands by programs for the embodiment of the present invention.

FIG. 4 is a specific diagram showing the exchange of commands between the programs. As was explained by referring to FIG. 3, X-Window, or more specifically, the X-Server, reports the written coordinate value to software dials every 50 msec (C1). Software dials executes a predetermined process, which will be described in detail in sub-division C, and transmits an acquired dial rotation value $\angle \theta$ to Soft5080 (C2). Software dials requests the X-Window to update the display of the position indicator according to the dial rotation value 110 θ (C3). Upon receipt of the report of the dial rotation value $\angle \theta$, Soft5080 requests the X-Window to update a graphic image currently being displayed (e.g., to rotate a graphic model around a selected axis at the rotation value of $\angle \theta$, or to translate, enlarge, or reduce the graphic model along a selected axis by a distance that is equivalent to the rotation value $\angle \theta$ (C4).

Figure 5:
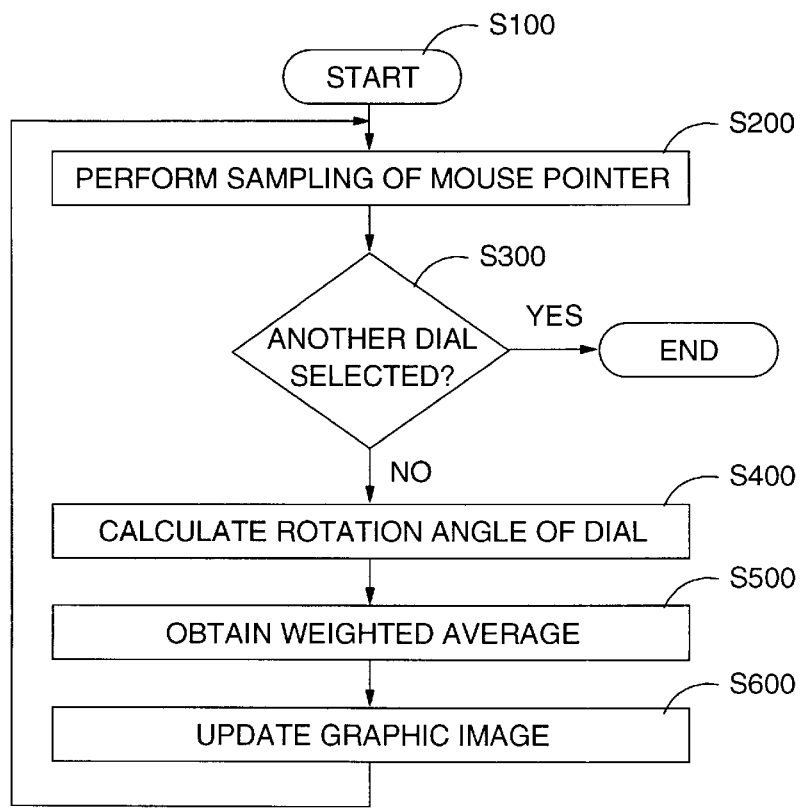
FIG. 5 is a flowchart showing a global routine for realizing the functions of the present invention.

The characteristic function of the coordinate input system and the method therefor, according to the present invention, is the performance of an emulation process to acquire a dial rotation value in accordance with a track drawn with an conventional coordinate pointing device, such as a mouse. FIG. 5 is a flowchart showing a global routine for realizing the individual functions of the present invention.

Figure 14:
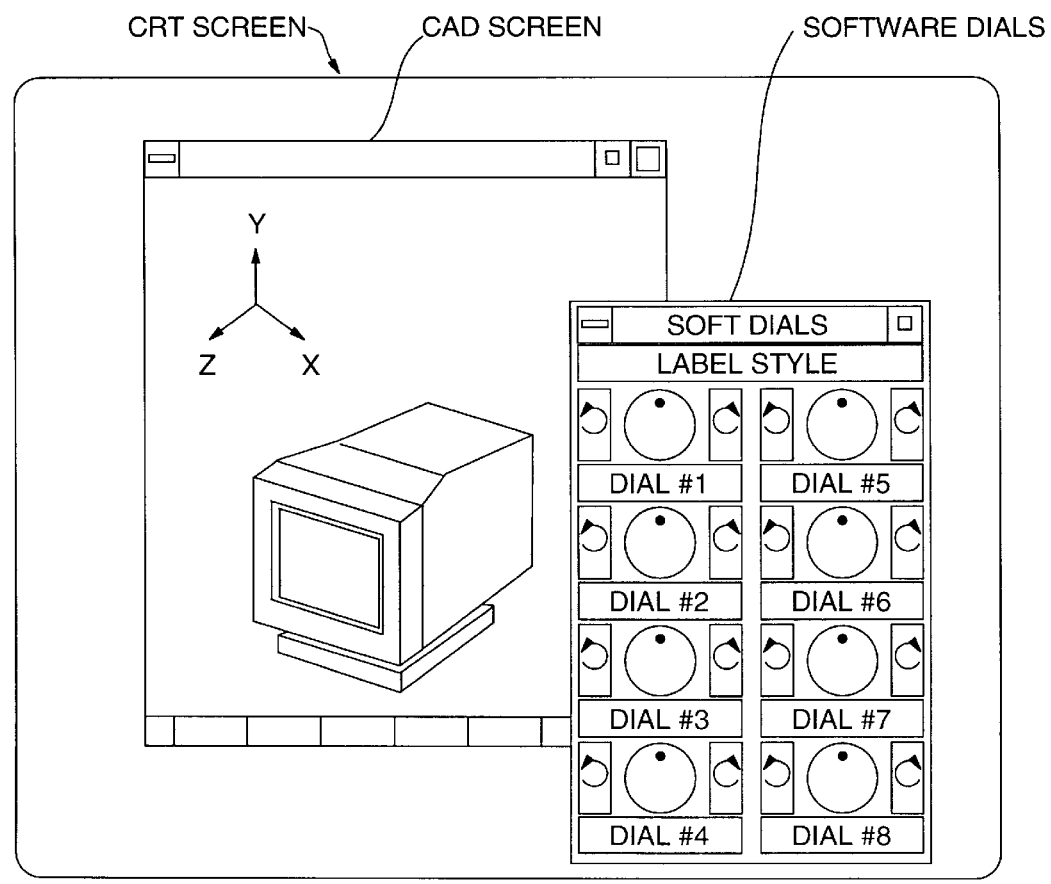
FIG. 14 is a schematic diagram illustrating a screen display of a window of "software dials" packaged with the software product "IBM Soft5080 for AIX" sold by IBM Japan Co., Ltd.
Figure 15:
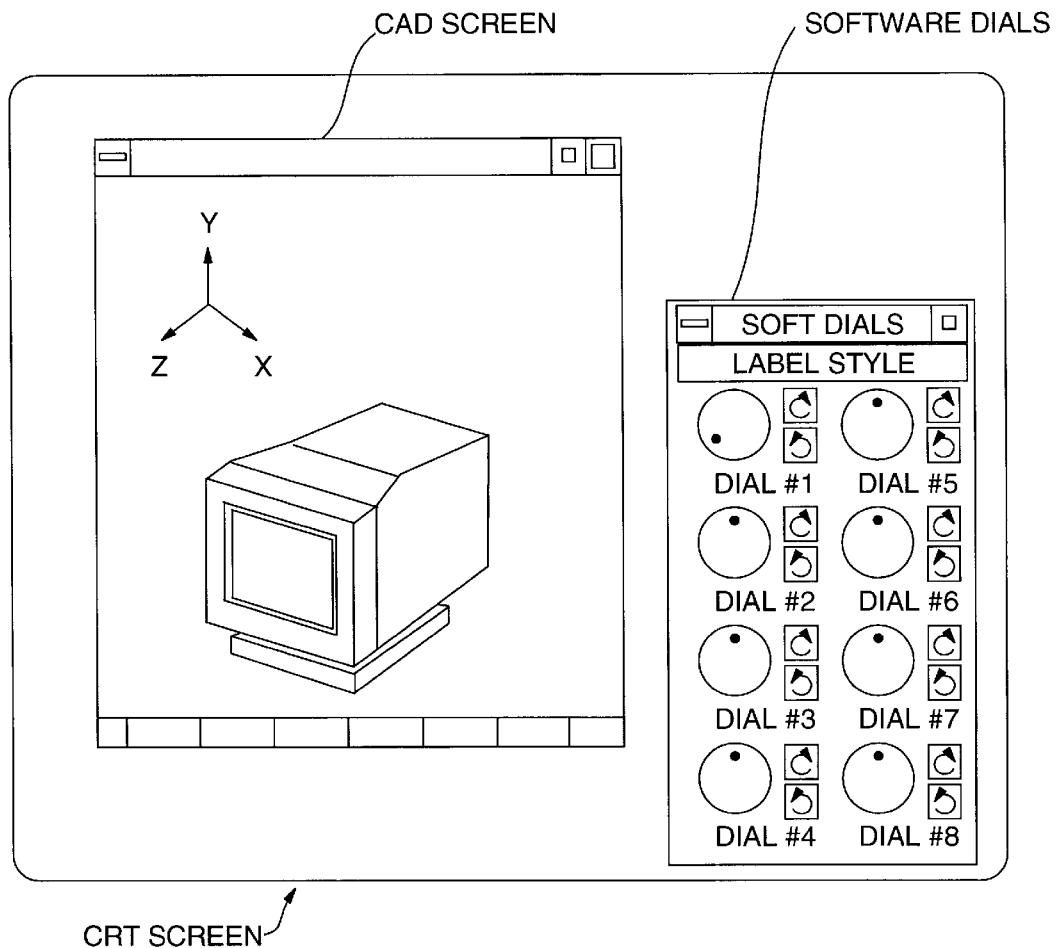
FIG. 15 is a schematic diagram illustrating a screen display of a window of "software dials" according to the embodiment.

The processing routine for software dials, according to this embodiment, is begun by the selection and operation of one of the eight dials in the software dials window shown in FIG. 14 (step S100). This processing routine continues until another dial is selected (S300). It should be noted that a selected dial may be highlighted so as to distinguish it from the other, unselected dials (see FIG. 15).

During the processing routine, every 50 msec X-Window reports to software dials the current coordinates pointed by a mouse pointer (S200). In other words, software dials performs coordinate sampling every 50 msec.

Then, software dials calculates a rotation angle $\angle \theta_n$ ($=P_n O_n P_{n+1}$) for an arc that passes between n-th input point $Pn(x_n, y_n)$ and an (n+1)-th input point $P_{n+1}(x_{n+1}, y_{n+1})$ (S400). The coordinate values of three sequential points $P_n$, $P_{n+1}$ and $P_{n+2}$ are employed to calculate the rotation value $\angle \theta_n$, which will be explained in detail in sub-division C-2 (n is a positive integer: the same can be applied herein.

Following this, software dials acquires a weighted average value for the n-th input rotation angle $\angle \theta_n$ and the one or more previously acquired rotation angles $\angle \theta_{n-1}$ ($=\angle P_{n-1} O_{n-1} P_n$), $\angle \theta_{n-2}$ ($=\angle P_{n-2} O_{n-2} P_{n-1}$), . . . (S500), in order to smooth the zigzag input for the track of the mouse pointer that was obtained sampling. The weighted average sub-routine will be described in detail in sub-division C-3.

Next, software dials communicates to Soft5080 the rotation angle $\angle(\theta_n)_{ave}$, which was acquired as a weighted average at step S500, and requests that X-Window update the rotation position of the position indicator so that it corresponds to the rotation angle $\angle(\theta_n)_{ave}$. Upon receipt of the rotation angle $\angle(\theta_n)_{ave}$, Soft5080 requests that X-Window update a graphic image in accordance with the dial rotation angle $\angle(\theta_n)_{ave}$ (for example, to rotate a currently displayed graphic model around a designated axis in accordance with the rotation angle $\angle(\theta_n)_{ave}$, or to move or enlarge/reduce the graphic model along a designated axis). X-Window updates the graphic image in accordance with the requests from software dials and Soft5080 (S600). The image updating procedures performed by X-Window are the following two: (1) the rotation of a display location, which is represented by the position indicator for a selected dial, in accordance with the rotation angle $\angle(\theta_n)_{ave}$ around a selected axis; and (2) the rotation of a currently displayed graphic model around a selected axis a distance that is equivalent to the rotation value $\angle(\theta_n)_{ave}$, or the movement or enlargement/reduction of the graphic model along a selected axis a distance that is equivalent to the rotation value $\angle(\theta_n)_{ave}$ After the graphic image has been updated, program control returns again to step S200, whereat sampling is performed for a coordinate value pointed by the mouse pointer. The sampling continues until another dial is selected.

Figure 6:
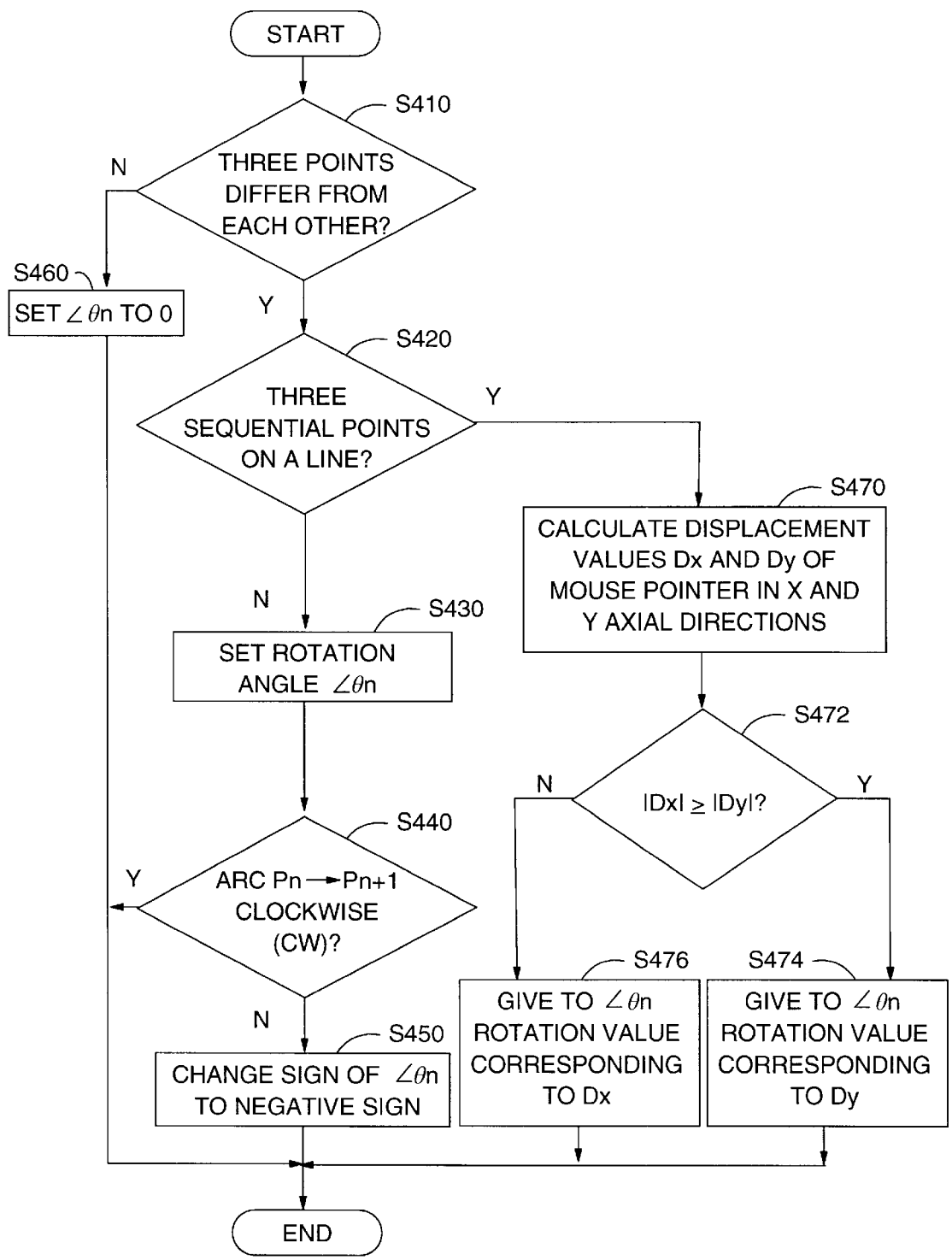
FIG. 6 is a flowchart of a sub-routine for the calculation of a rotation angle according to the embodiment.

In this sub-division, the rotation angle calculation sub-routine (step S400 in FIG. 5) executed by software dials will be further explained in detail. FIG. 6 is a flowchart for the rotation angle calculation sub-routine. In this sub-routine, a central angle $\angle \theta_n$ ($=\angle P_n O_n P_{n+1}$) for an arc $P_n P_{n+1}$ is calculated by using the coordinate values for the three sequential input points obtained by sampling, $P_n(x_n, y_n)$, $P_{n+1}(x_{n+1}, y_{n+1})$ and $P_{n+2}(x_{n+2}, y_{n+2})$.

In the sub-routine, first, a check is performed to determine whether or not the three sequential input points obtained by sampling, $P_n$, $P_{n+1}$ and $P_{n+2}$, differ from each other (step S410). The process at the decision block is performed in order not to use coordinate values obtained by periodical sampling during a period in which an operator does not manipulate a mouse so that a graphic image shall be prevented from being unnecessarily updated. Therefore, when the result at the decision block is negative, the following steps S420, S430, . . . are skipped, and zero is provided for the rotation angle Zen ($=\angle P_n O_n P_{n+1}$) (step S460). The rotation angle calculation sub-routine is thereafter terminated. When the result at the decision bock is affirmative, program control advances to the succeeding step S420.

At step S420, a check is performed to determine whether the three sequential input points obtained by sampling, $P_n$, $P_{n+1}$ and $P_{n+2}$ are located on nearly a straight line. When the three input points are located on an about straight line, it is assumed that an operator desires linear input manipulation with a mouse, and program control moves to an exception process routine at step S470 and the following steps. The decision as to whether or not the three sequential input points are aligned on nearly a straight line is made by the same geometric method as is used at the succeeding step S440, whereat whether or not the direction of travel an arc $P_n \rightarrow P_{n+1}$ is clockwise (CW) is determined.

When the result at the decision block at step S420 is negative, program control advances to the succeeding step S430, whereat the rotation angle $\angle\theta_n$ is to be calculated by using the geometric method (see "CALCULATION OF ROTATION ANGLE $\angle\theta_n$").

At decision block S440, a check is performed to determine whether or not the direction of travel of the arc $P_n \rightarrow P_{n+1}$ is clockwise (CW) or counterclockwise (CCW). This decision is made by using the same geometric method as is used at step S420. If the direction of travel of the arc is clockwise, a positive sign is given to the rotation angle $\angle\theta_n$, and the sub-routine is thereafter terminated. If the direction of travel of the arc is counterclockwise, a negative sign is affixed to the rotation angle $\angle\theta_n$, and the sub-routine is thereafter terminated (step S450).

Exception Process Routine:

An explanation will now be given for the exception process routine at step S470 and the following steps, which is performed when the three sequential input points obtained by sampling, $P_n$, $P_{n+1}$ and $P_{n+2}$, are aligned on nearly a straight line.

At step S470, displacement distances $D_x$ and $D_y$ for the mouse pointer along the x and y axes are acquired between the two points $P_n$ and $P_{n+1}$.

At step S472, the absolute value of the displacement distance $D_x$ along the x axis is compared with the absolute value of the displacement distance $D_y$ along the y axis.

If $|D_x| \geq |D_y|$, program control branches to Yes at decision block S472. In this case, it is assumed that an operator desires an input operation using the displacement in the x axial direction. An angle equivalent to $D_x$ and a positive or negative sign corresponding to the sign for $D_x$ are provided for the rotation angle $\angle\theta_n$ (step S474). The process is thereafter terminated.

If $|D_x| < |D_y|$, program control branches to No at decision block S472. In this case, it is assumed that an operator desires an input operation using the displacement in the y axial direction. An angle equivalent to $D_y$ and a positive or negative sign corresponding to the sign for $D_y$ are provided for the rotation angle $\angle\theta_n$ (step S476). The process is thereafter terminated.

Some operators will feel that it is easier and more intuitive to input dial rotation values by employing the linear manipulation of a mouse, i.e., the distance the mouse pointer travels, than it is to instruct a dial rotation value for rotation in accordance with the angle of an arc. When, for example, an operator desires to operate software dials for movement along an axis instead of rotation around the axis, linear manipulation of a mouse is appropriate. The above described exception process routine (steps S470 to S476) can respond to such a demand.

Decision for Clockwise/Counterclockwise Travel:

An explanation will now be given for a process routine for determining whether or not three sequential points obtained by sampling, $P_n$, $P_{n+1}$ and $P_{n+2}$ are located almost on nearly a straight line, and whether the direction of travel of the arc $P_n \rightarrow P_{n+1}$ is clockwise (CW) or counterclockwise (CCW). This process routine is employed at the above described steps S420 and S440.

Figure 7:
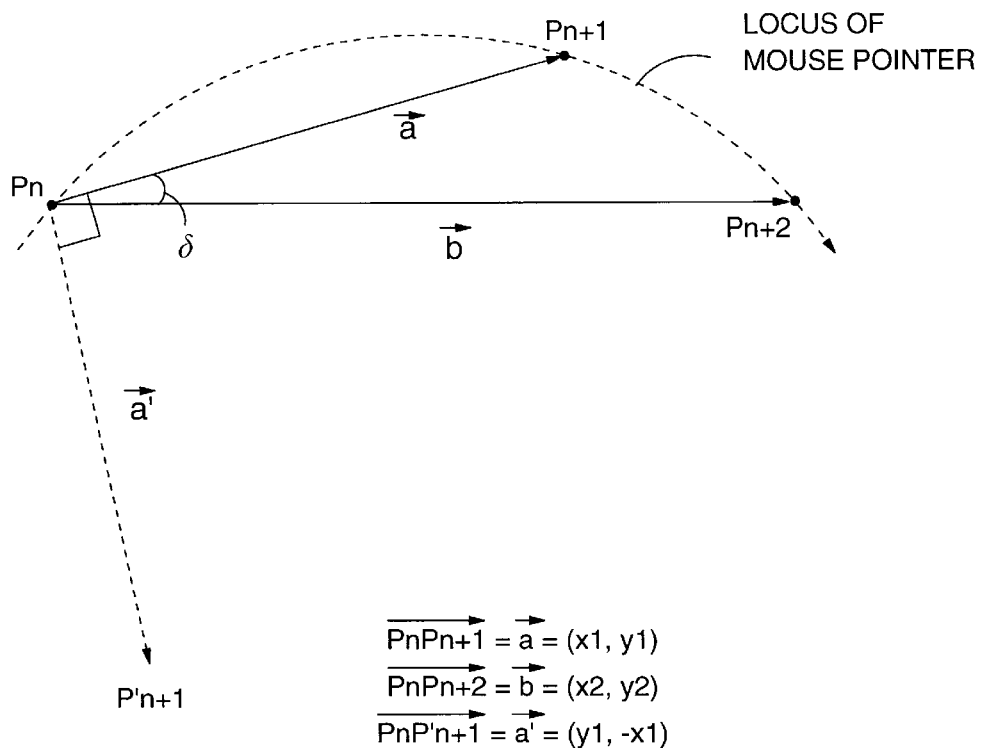
FIG. 7 is a diagram showing a process for determining whether the direction of travel of an arc $P_n \rightarrow P_{n+1}$ is clockwise (CW) or counterclockwise (CCW).

In FIG. 7 is shown an example wherein sampling is performed clockwise at three sequential points $P_n$, $P_{n+1}$ and $P_{n+2}$. Suppose that vector $P_nP_{n+1}$=vector a=$(x_1, y_1)$ and vector $P_nP_{n+2}$=vector b=$(x_2, y_2)$, and that $P'_{n+1}$ denotes a point obtained by rotating the point $P_{n+1}$ at the point $P_n$ 90° clockwise. Then, vector $P_nP'_{n+1}$=vector a'=$(y_1, -x_1)$.

When $\angle P_{n+1}P_nP_{n+2}=\angle\delta$, the inner product of the vector a' and a vector b is represented by Expression (1).

$$\vec{a'} \cdot \vec{b} = |\vec{a}||\vec{b}|\cos(90° - \delta)$$

As was previously described, sampling is performed at the sequential input points $P_n$, $P_{n+1}$, $P_{n+2}$, ... every 50 msec. It is impossible for an ordinary operator to make an entry such that $\angle P_{n+1}P_nP_{n+2}$ (=$\angle\delta$) exceeds 180° within the extremely short period of 100 msec. Therefore, the inner product a'·b, acquired by the Expression (1), is negative, i.e., (90°–$\angle\delta$)>90°, only when $\angle\delta$ is a negative value, i.e., only when three sequential points $P_n$, $P_{n+1}$ and $P_{n+2}$ are located in a counterclockwise direction. Further, the inner product a'·b is zero only when $\angle\delta$ is 0°, i.e., only when the three sequential input points $P_n$, $P_{n+1}$ and $P_{n+2}$ are located on nearly a straight line.

In other words, whether or not the direction of the track that passes through the sequential input points $P_n$, $P_{n+1}$ and $P_{n+2}$ is clockwise, and whether or not these points are located on nearly a straight line are determined by using a comparison of the inner product a'·b with zero as follows:

inner product a'·b>0→clockwise (CW)
inner product a'·b=0→on nearly a straight line
inner product a'·b<0→counterclockwise (CCW)

Calculation of Rotation Angle $\angle\theta_n$:

The procedure at step S430 for the calculation of the rotation angle $\angle\theta_n$ will be specifically described while referring to FIGS. 8 through 11.

Figure 9:
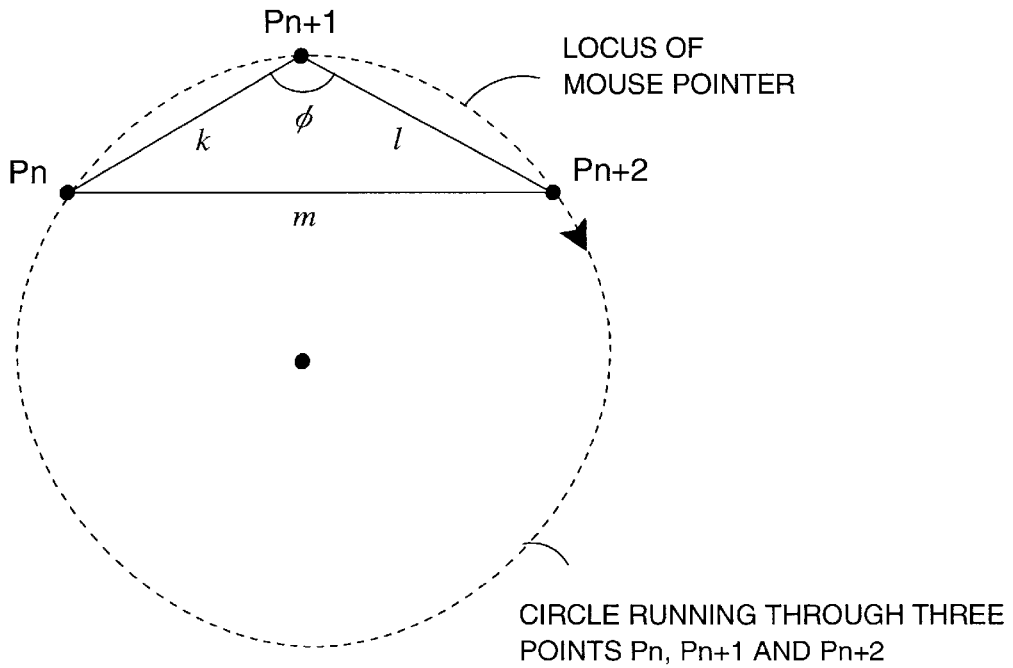
FIG. 9 is a diagram for explaining in detail a method for calculating a rotation angle $\angle \theta_n$ at step S400.
Figure 8:
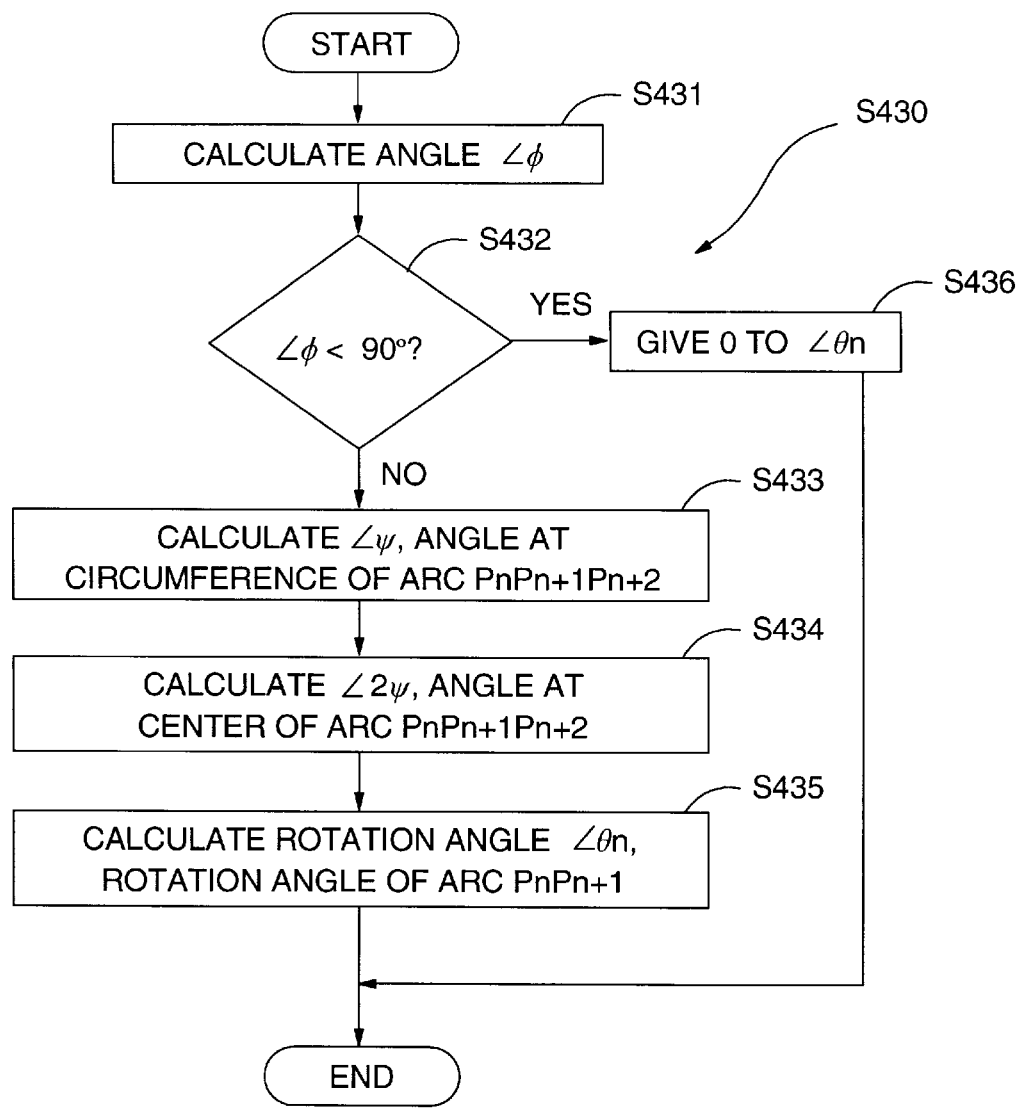
FIG. 8 is a diagram for explaining in detail a method for calculating a rotation angle $\angle \theta_n$ at step S400.
Figure 10:
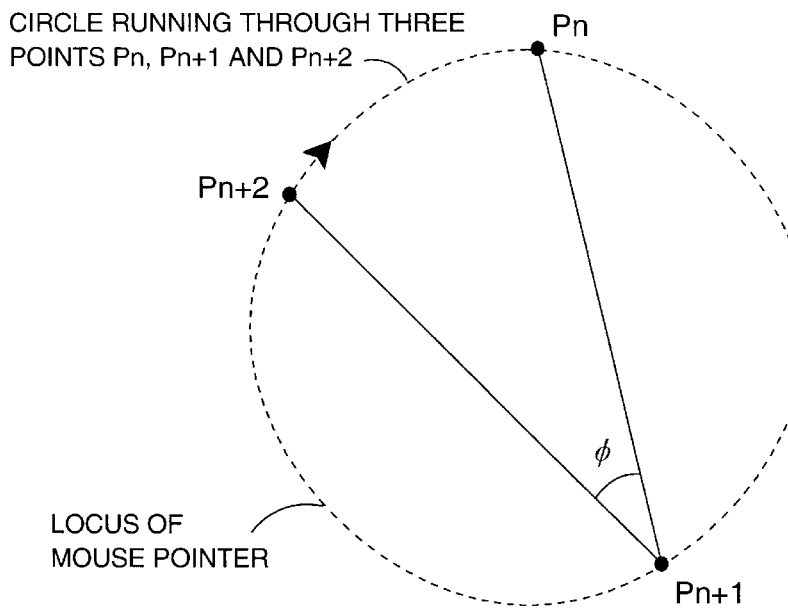
FIG. 10 is a diagram for explaining in detail a method for calculating a rotation angle $\angle \theta_n$ at step S400.
Figure 10:
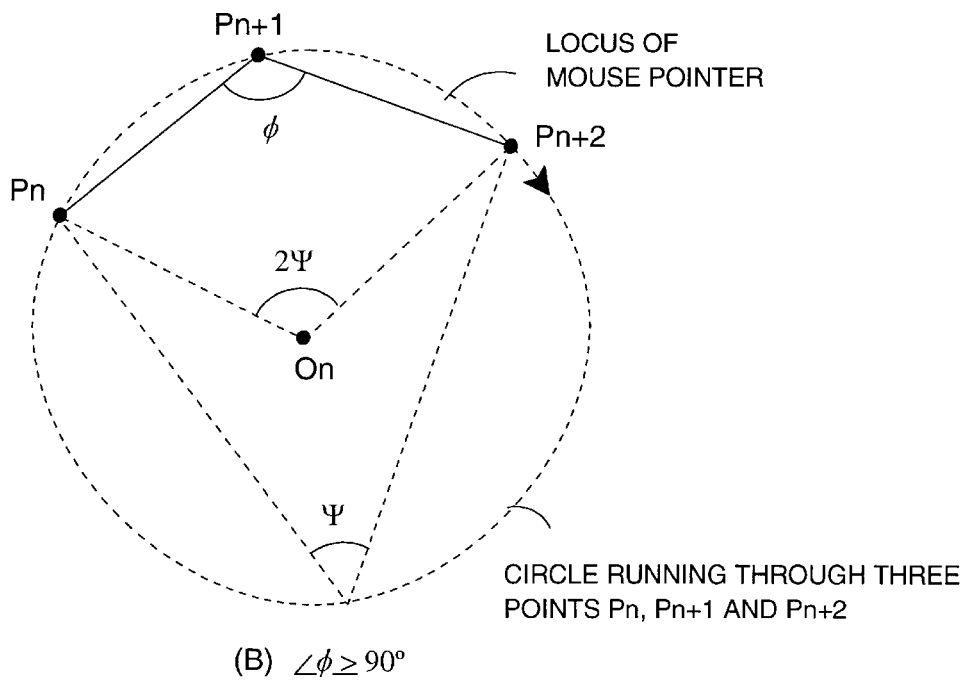

At step S431, an included angle $\angle P_nP_{n+1}P_{n+2}$ (=$\angle\phi$)) of the three sequential points $P_n$, $P_{n+1}$ and $P_{n+2}$ is acquired. As is shown in FIG. 9, suppose that the lengths of the individual sides of a triangle $P_nP_{n+1}P_{n+2}$ are l, m and k. According to the law of cosines, the relationship between $\angle\phi$ and the lengths l, m and k is established by Expression (2). Since the lengths l, m and k of the individual sides can be acquired by simple vector distance calculation, $\angle\phi$ can be calculated.

$$\cos\angle\phi = \frac{m^2 - l^2 - k^2}{2lk}$$

Then, at step S432, a check is performed to determine whether $\angle\phi$ is smaller than 90°. The condition that $\angle A$ is less than 90° occurs when an operator substantially reciprocates a mouse pointer as shown in FIG. 10(a). It is assumed that the reciprocation of a mouse pointer within a short period of 100 msec (required for sampling three points) is caused by the vibration transmitted by the hand of the operator, i.e., the erroneous operation of the mouse. If a screen display follows such an erroneous operation, a graphic image on a screen will be rotated/moved contrary to the desire of the operator, or will be difficult to discern. When the result at decision block S432 is affirmative, therefore, program control exits from the regular routine. Then, zero is provided for the rotation angle $\angle\theta_n$ (step S438), and the sub-routine is thereafter terminated.

When the result at decision block S432 is negative, i.e., when $\angle\phi$ is 9° or greater (see FIG. 10(b)), coordinate values sequentially obtained by sampling is assumed to be correct, and program control advances to the succeeding regular process.

At step S433, the angle at the circumference, $\angle\psi$, for the arc $P_nP_{n+1}P_{n+2}$ is calculated. The angle $\angle\psi$ is acquired according to a well known geometrical formula that "the total of the angles at the circumference (=$\angle\phi+\angle\psi$) for the respective major and minor arcs is equal to 18°".

Then, at step S434, a central angle for an arc $P_nP_{n+1}P_{n+2}$ is acquired. Calculation of the central angle is based on a so-called theorem for an angle at the circumference, that "the angle at the circumference of an arc is equal to one half of the central angle relative to that arc".

Figure 11:
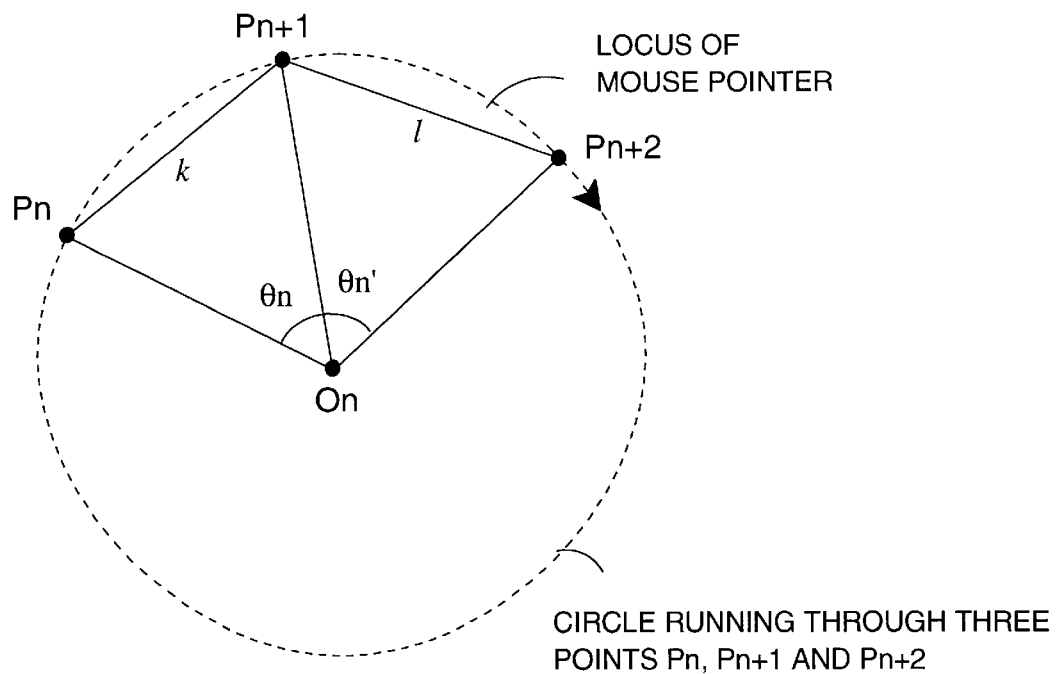
FIG. 11 is a diagram for explaining in detail a method for calculating a rotation angle $\angle \theta_n$ at step S400.

Next, at step S435, the rotation angle $\angle\theta_n$ ($=P_nO_nP_{n+1}$), which is represented by the points $P_n$ and $P_{n+1}$, is calculated by using the central angle $\angle 2\psi$ for the arc $P_nP_{n+1}P_{n+2}$, As is shown in FIG. 11 and by Expression (3), the central angle $\angle 2\psi$ consists of $\angle\theta_n$ ($=\angle P_nO_nP_{n+1}$) and $\angle\theta_n{}'$ ($=\angle P_{n+1}O_nP_{n+2}$).

$$\angle 2\psi = \angle n + \angle\theta n'$$

When $\angle\theta_n$ and $\angle\theta_n{}'$ are minute angles, approximate Expression (4) can be established. When this Expression (4) is used to delete $\angle\theta_n{}'$ from Expression (3), the central angle $\angle\theta_n$ can be obtained.

$$\frac{k}{\angle\theta n} \approx \frac{l}{\angle\theta n'}$$

Of course, the rotation angle $\angle\theta_n$ can be obtained by calculating the coordinate for the center of the circle $O_n$. However, a relatively complicated calculation is required to acquire the center coordinate of the circle from the coordinate values of three points $P_n$, $P_{n+1}$ and $P_{n+2}$. It should be understood that, according to the calculation process for the rotation angle $\angle\theta_n$ in the flowchart in FIG. 8, the center coordinate of the circle $O_n$ does not have to be calculated.

A detailed explanation will now be given for the weighted average calculation step( S500 in FIG. 5) that software dials executes.

Even when an operator intends to draw a smooth curve by using a mouse, coordinate values sequentially obtained by sampling may actually be noncontiguous and form a zigzag pattern. If a graphic model and a graphic image presented by software dial is updated by following the zigzag input, the image will be awkwardly rotated/moved. The weighted average calculation smoothes such zigzag input.

To acquire the weighted average value for the rotation angle $\angle\theta_n$, weighting factors are employed to individually multiply $\angle\theta_n$ and one or more previously acquired rotation angles $\angle\theta_{n-1}$ ($=\angle P_{n-1}O_{n-1}P_n$), $\angle\theta_{n-2}$ ($=\angle P_{n-2}O_{n-2}P_{n-1}$), . . ., and the sum of the products is divided by the sum of the weighting factors. In other words, the weighted average value $\angle(\theta_n)_{ave}$ of the rotation angle $\angle\theta_n$ is calculated by Expression (5). In this Expression, the subject rotation angle $\angle\theta_n$ is multiplied by the maximum weighting factor "8", and the previous rotation angles $\angle\theta_{n-1}$, $\angle\theta_{n-2}$ and $\angle\theta_{n-3}$ are multiplied by weighting factors 4, 2 and 1, respectively.

$$\angle(\theta n)ave = \frac{\angle\theta n \times 8 + \angle\theta_{n-1} \times 4 + \angle\theta_{n-2} \times 2 + \angle\theta_{n-3}}{8+4+2+1}$$

Since the weighted average calculation process is performed, the rotation angle $\angle(\theta_n)_{ave}$, which reflects the context of the track that the mouse pointer indicates, can be used as a control data. As a result, the zigzag input can be smoothed.

Computation results acquired through the processing routines explained in sub-divisions C-1, C-2 and C-3 will specifically be described by actually using an input coordinate value.

In a work area for software dials, a control table is prepared in which coordinate values sequentially input by X-Window every 50 msec are temporarily stored. Table 1 shows a specific control table.

|  | Pn | Pn$_{-1}$ | Pn$_{-2}$ | Pn$_{-3}$ |
|---|---|---|---|---|
| X | 0 | 0 | 0 | 0 |
| Y | 0 | 0 | 0 | 0 |
| $\angle\theta$ | 0 | 0 | 0 | 0 |

In the control table, one record is assigned for each coordinate point. In Table 1, four records are prepared to store data for four coordinate points. Each record consists of three fields in which xy coordinate values, $x_n$ and $y_n$, of a coordinate point and the rotation angle $\angle\theta_n$ are written. In the initial state, as is shown in Table 1, zero is written in each field.

When a Curve is Drawn with a Mouse Pointer

First, a process during which an operator moves a mouse pointer to describe a curve will be described.

Upon receipt of a first coordinate value (799, 456) from X-Window, the value is written in the first record. At this time, since coordinate values for three points do not exist and the rotation angle $\angle\theta_n$ can not be calculated, the rotation angle remains zero (see Table 2). The weighted average value $\angle(\theta_n)_{ave}$ for the rotation angle is also zero.

|  | Pn | Pn$_{-1}$ | Pn$_{-2}$ | Pn$_{-3}$ |
|---|---|---|---|---|
| X | 799 | 0 | 0 | 0 |
| Y | 456 | 0 | 0 | 0 |
| $\angle\theta$ | 0 | 0 | 0 | 0 |

Then, when 50 msec later the next coordinate value (797, 456) is received from the X-Window, the content of the record is shifted by one stage, and the new coordinate value (797, 456) is written in the first record. At this time, the rotation angle $\angle\theta_n$ can not yet be acquired and remains zero (see Table 3). The weighted average value $\angle(\theta_n)_{ave}$ for the rotation angle is also zero.

|  | Pn | Pn$_{-1}$ | Pn$_{-2}$ | Pn$_{-3}$ |
|---|---|---|---|---|
| X | 799 | 799 | 0 | 0 |
| Y | 456 | 456 | 0 | 0 |
| $\angle\theta$ | 0 | 0 | 0 | 0 |

When 50 msec later the next coordinate value (790, 450) is received from X-Window, the content of the record is shifted by one stage, and the new coordinate value (790, 450) is written in the first record. The coordinate values for three sequential input points have now been collected, and then the rotation angle is calculated at step S400 in FIG. 5. The three sequential points, $P_n$(790, 450), $P_{n-1}$(797, 456) and $P_{n-2}$(799, 456), differ from each other (step S410) and are not located on nearly a straight line (step S420). Thus, the rotation angle $\angle\theta_n$ is acquired by the geometric calculation at step 430. Since the result is $\angle\theta_n=8°$, "8" is written in the lowermost field in the first record (see Table 4). The weighted average value of the rotation angle is acquired by Expression (5). The result $\angle(\theta_n)_{ave}=(8\ 8\ 4\ 0\ 2\ 0\ 1\ 0)/(8\ 4\ 2\ 1) \approx 4°$ is transmitted as a dial rotation value to Soft5080. Soft5080 requests X-Window update a graphic image in accordance with the dial rotation distance (step S600). The specific objectives for the updating of the image are the following two: (1) the rotation of a currently displayed the position indicator of a selected dial in accordance with the rotation angle $\angle(\theta_n)_{ave}$ around a selected axis; and (2) the rotation of a currently displayed graphic model around a selected axis a distance equivalent to the rotation value $(\theta_n)_{ave}$, or the movement or enlargement/reduction of the graphic model along a selected axis a distance proportional to the rotation value $(\theta_n)_{ave}$ (hereinafter the same can be applied).

|     | Pn  | Pn$_{-1}$ | Pn$_{-2}$ | Pn$_{-3}$ |
| --- | --- | --- | --- | --- |
| X   | 790 | 797 | 799 | 0 |
| Y   | 450 | 456 | 450 | 0 |
| $\angle\theta$ | 8 | 0 | 0 | 0 |

When, 50 msec later, the next coordinate value (780, 438) is received from X-Window, the content of the record is shifted by one stage, and the new coordinate value (780, 438) is written in the first record. The rotation angle is calculated at step S400 and the result $\angle\theta_n=14°$ is written in the lowermost field in the first record (see Table 5). The weighted average value of the rotation angle is acquired by Expression (5). The result $\angle(\theta_n)_{ave}=(8\ 14\ 4\ 8\ 2\ 0\ 1\ 0)/(8\ 4\ 2\ 1)\approx 9°$ is transmitted as a dial rotation value to Soft5080. Soft 5080 requests that X-Window update a graphic image in accordance with the dial rotation distance (step S600).

|     | Pn  | Pn$_{-1}$ | Pn$_{-2}$ | Pn$_{-3}$ |
| --- | --- | --- | --- | --- |
| X   | 780 | 790 | 797 | 799 |
| Y   | 438 | 450 | 456 | 456 |
| $\angle\theta$ | 14 | 8 | 0 | 0 |

Further, when 50 msec later the next coordinate value (776, 425) is received from X-Window, the content of the record is shifted by one stage, and the new coordinate value (776, 425) is written in the first record. The rotation angle is calculated at step S400 and the result $\angle\theta_n=22°$ is written in the lowermost field in the first record (see Table 6). The weighted average value of the rotation angle is acquired by Expression (5). The result $\angle(\theta_n)_{ave}=(8\ 22\ 4\ 14\ 2\ 8\ 1\ 0)/(8\ 4\ 2\ 1)\approx 15°$ is transmitted as a dial rotation value to Soft5080. Soft5080 requests that X-Window update a graphic image in accordance with the dial rotation distance (step S600).

|     | Pn  | Pn$_{-1}$ | Pn$_{-2}$ | Pn$_{-3}$ |
| --- | --- | --- | --- | --- |
| X   | 776 | 780 | 790 | 797 |
| Y   | 425 | 438 | 450 | 456 |
| $\angle\theta$ | 22 | 14 | 8 | 0 |

When a Mouse Pointer Moves on Nearly a Straight Line:

Next, a process in which an operator moves a mouse pointer on nearly a straight line will be described.

Upon receipt of a first coordinate value (532, 450) from X-Window, this value is written in the first record. At this time, since coordinate values for three sequential points do not exist and the rotation angle $\angle\theta_n$ can not be calculated, the rotation angle remains zero (see Table 7). The weighted average value $\angle(\theta_n)_{ave}$ for the rotation angle is also zero.

| latest input | 532 | 0 | 0 | 0 | rotation angle: |
| --- | --- | --- | --- | --- | --- |
| coordinate value: | 450 | 0 | 0 | 0 | $\angle(\theta n)ave$ |
| X = 532 | 0 | 0 | 0 | 0 | = 0 |
| Y = 450 | | | | | |

Then, when 50 msec later the next coordinate value (532, 450) is received from X-Window, the content of the record is shifted by one stage, and the new coordinate value (532, 450) is written in the first record. At this time, the rotation angle $\angle\theta_n$ can not be acquired yet and remains zero (see Table 8). The weighted average value/$(\theta_n)_{ave}$ for the rotation angle is also zero.

| latest input | 532 | 532 | 0 | 0 | rotation angle: |
| --- | --- | --- | --- | --- | --- |
| coordinate value: | 450 | 450 | 0 | 0 | $\angle(\theta n)ave$ |
| X = 532 | 0 | 0 | 0 | 0 | = 0 |
| Y = 450 | | | | | |

When 50 msec later the next coordinate value (533, 450) is received from X-Window, the content of the record is shifted by one stage, and the new coordinate value (533, 450) is written in the first record. Although the coordinate values of three points have now been collected, they are located along a straight line (step S420). Program control moves to step S470 in FIG. 5 for the exception process, and the displacement distances in the x and y axial directions are calculated. The displacement value 1 in the x axial direction, which is greater than the value in the y axial direction, is employed as the rotation angle $\angle\theta_n$ (step S474), and "1" is written in the lowermost field in the first record (see Table 9). The weighted average value for the rotation angle is calculated by Expression (5). The result $\angle(\theta_n)_{ave}=(8\ 1\ 4\ 0\ 2\ 0\ 1\ 0)/(8\ 4\ 2\ 1)\approx 0°$ is transmitted as a dial rotation value to Soft5080.

| latest input | 533 | 532 | 532 | 0 | rotation angle: |
| --- | --- | --- | --- | --- | --- |
| coordinate value: | 450 | 450 | 450 | 0 | $\angle(\theta n)ave$ |
| X = 533 | 1 | 0 | 0 | 0 | = 0 |
| Y = 450 | | | | | |

When another 50 msec later the next coordinate value (543, 450) is received from X-Window, the content of the record is shifted by one stage, and the new coordinate value (543, 450) is written in the first record. Since the three sequential points are located on nearly a straight line (step S420), program control moves to step S470 in FIG. 5 for the exception process, and the displacement distances in the x and y axial directions are calculated. The displacement value 10 in the x axial direction, which is greater than the value in the y axial direction, is employed as the rotation angle $\angle\theta_n$ (step S474), and "10" is written in the lowermost field in the first record (see Table 10). The weighted average value of the rotation angle is calculated by Expression (5). The result $\angle(\theta_n)_{ave}=(8\ 10\ 4\ 1\ 2\ 0\ 1\ 0)/(8\ 4\ 2\ 1)\approx 5°$ is transmitted as a dial rotation value to Soft5080. Soft5080 requests that X-Window update a graphic image in accordance with the dial rotation distance (step S600).

| latest input | 543 | 533 | 532 | 532 | rotation angle: |
| --- | --- | --- | --- | --- | --- |
| coordinate value: | 450 | 450 | 450 | 450 | $\angle(\theta n)ave$ |
| X = 543 | 10 | 1 | 0 | 0 | = 5 |
| Y = 450 | | | | | |

When another 50 msec later the next coordinate value (560, 450) is received from X-Window, the content of the record is shifted by one stage, and the new coordinate value (560, 450) is written in the first record. Since the three sequential points are located on nearly a straight line (step S420), program control moves to step S470 in FIG. 5 for the exception process, and the displacement distances in the x and y axial directions are calculated. The displacement value 17 in the x axial direction, which is greater than the value in the y axial direction, is employed as the rotation angle $\angle\theta_n$ (step S474), and "17" is written in the lowermost field in the first record (see Table 11). The weighted average value of the rotation angle is calculated by Expression (5). The result $\angle(\theta_n)_{ave}=(8\ 17\ 4\ 10\ 2\ 1\ 1\ 0)/(8\ 4\ 2\ 1)\approx 11°$ is transmitted as a dial rotation value to Soft5080. Soft5080 requests that X-Window update a graphic image in accordance with the dial rotation distance (step S600).

| latest input coordinate value: X = 560 Y = 450 | 560 450 17 | 543 450 10 | 533 450 1 | 532 450 0 | rotation angle: $\angle(\theta n)ave$ = 11 |
|---|---|---|---|---|---|

Further, when another 50 msec later the next coordinate value (588, 450) is received from X-Window, the content of the record is shifted by one stage, and the new coordinate value (588, 450) is written in the first record. Since the three sequential points are located on nearly a straight line (step S420), program control moves to step S470 in FIG. 5 for the exception process, and the displacement distances in the x and y axial directions are calculated. The displacement value 28 in the x axial direction, which is greater than the value in the y axial direction, is employed as the rotation angle $\angle\theta_n$ (step S474), and "28" is written in the lowermost field in the first record (see Table 12). The weighted average value of the rotation angle is calculated by Expression (5). The result $\angle(\theta_n)_{ave}=(8\ 28\ 4\ 17\ 2\ 10\ 1\ 1)/(8\ 4\ 2\ 1)\approx 19°$ is transmitted as a dial rotation value to Soft5080. Soft5080 requests that X-Window update a graphic image in accordance with the dial rotation distance (step S600).

| latest input coordinate value: X = 588 Y = 450 | 588 450 28 | 560 450 17 | 543 450 10 | 533 450 1 | rotation angle: $\angle(\theta n)ave$ = 19 |
|---|---|---|---|---|---|

Weighted Average Calculation Process

Finally, the process for smoothing the dial rotation distance by performing the weighted average calculation process will be described.

In Table 13, the real rotation angle $\angle\theta_n$ which are acquired by the input coordinate values, are entered in the upper level, and the rotation angles $\angle(\theta_n)_{ave}$, which are acquired as weighted average values by calculating Expression (5), are entered in the lower level. That the weighted average values $\angle(\theta_n)_{ave}$ are correct is apparent when the individual rotation angles $\angle\theta_n$ are substituted into Expression (5).

| n | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $\angle\theta n$ | -28 | -30 | -13 | -25 | -29 | -21 | -28 | 0 | 19 | 22 | 27 | 19 | 26 | 23 |
| $\angle(\theta n)ave$ | -16 | -24 | -19 | -22 | -25 | -23 | -26 | -12 | 5 | 14 | 22 | 21 | 24 | 23 |

Figure 12:
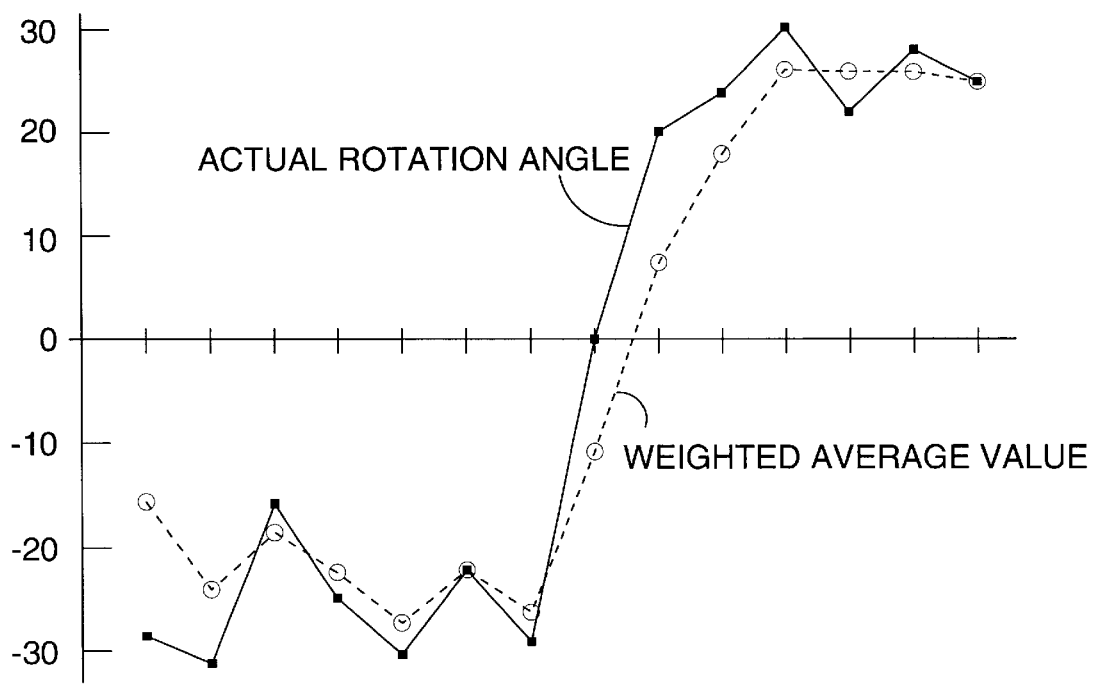
FIG. 12 is a graph showing plotted rotation angles $\angle \theta_n$ and weighted average values $\angle(\theta_n)_{ave}$ sequentially calculated in the sub-routine for weighted average calculation (step S500).
Figure 13:
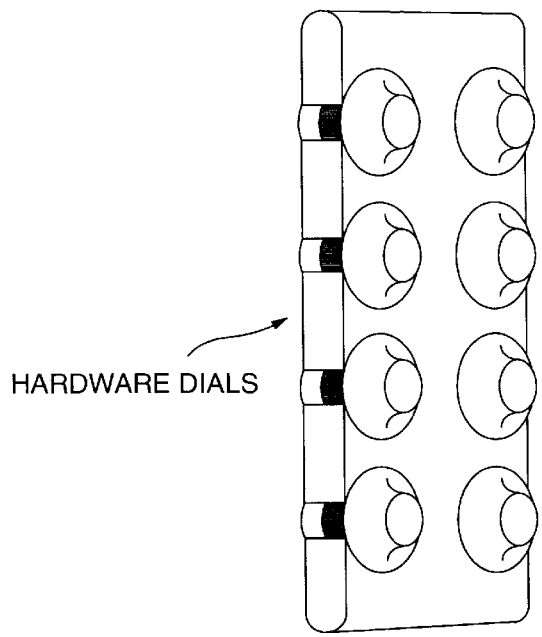
FIG. 13 is a diagram showing the outline of a rotary input device "6094 Dials Model 010" sold by IBM Corp.

FIG. 12 is a graph for plotting the rotation angles $\angle\theta_n$ sequentially acquired and their weighted average values $\angle(\theta_n)_{ave}$. It is obvious from the graph that by using the weighted average calculation process, which is based on the context of the previously input coordinate values, dial rotation values were smoothed.

In the drawings and specifications there has been set forth a preferred embodiment of the invention and, although specific terms are used, the description thus given uses terminology in a generic and descriptive sense only and not for purposes of limitation.

What is claimed is:

1. A computer system having a coordinate input capability, comprising:

a processor;

memory operatively coupled to the processor and storing data to be processed, the memory including a coordinate value of an input point $P_i(x_i, y_i)$ that is sequentially input by a coordinate pointing device (subscript "i" is a positive integer and indicates an input count);

first program stored in the memory and executable on the processor to calculate a central angle $\angle P_n O_n P_{n+2}$ relative to an arc $P_n P_{n+1} P_{n+2}$ of a circle $O_n$, circumscribed about three sequential input points $P_n(x_n, y_n)$, $P_{n+1}(x_{n+1}, y_{n+1})$ and $P_{n+2}(x_{n+2}, y_{n+2})$, the coordinate value of the three sequential input points $P_n(x_n, y_n)$, $P_{n+1}(x_{n+1}, y_{n+1})$ and $P_{n+2}(x_{n+2}, y_{n+2})$ being stored in the memory (n is a positive integer);

a second program stored in the memory and executable on the processor to calculate a rotation angle $\angle\theta_n(=\angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

a third program stored in the memory and executable on the processor to employ the calculated rotation angle $\angle\theta_n$ as a control data; and wherein, in response to an absence of any substantial arcuate displacement existing among the three sequential input points $P_n(x_n, y_n)$, $P_{n+1}(x_{n+1}, y_{30\ 1})$ and $P_{n+2}(x_{n+2}, y_{n+2})$ the second program is forestalled and the control data is set to zero.

2. A computer system having a coordinate input capability and comprising:

a processor;

memory operatively coupled to said processor and storing data to be processed, said memory including a coordinate value of an input point $P_i(x_i, y_i)$ that is sequentially input by a coordinate pointing device (subscript "i" is a positive integer and indicates the number of inputs);

a first program stored in said memory and executable on said processor to calculate a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}, y_{n+1})$ and $P_{n+2}(x_{n+2}, y_{n+2})$, the coordinate value of the three sequential input points $P_n(x_n, y_n)$, $P_{n+1}(x_{n+1}, y_{n+1})$ and $P_{n+2}(x_{n+2}, y_{n+2})$ being stored in said memory (n is a positive integer);

a second program stored in said memory and executable on said processor to calculate a rotation angle $\angle\theta_n(=\angle P_n O_n, P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

a third program stored in said memory and executable on said processor to calculate a weighted average for the rotation angle $\angle\theta_n$, and one or more previously obtained rotation angles, $\angle\theta_{n-1}$ $(=\angle P_{n-1} O_{n-1} P_n)$, $\angle\theta_{n-2}(=\angle P_{n-2} O_{n-2} P_{n-1})$, . . . ; and a fourth program stored in said memory and executable on said processor to employ the averaged rotation angle $\angle(\theta_n)_{ave}$ as a control data.

3. A computer system according to claim 2, wherein, in response to an absence of any substantial arcuate displacement exists among the three sequential input points $P_n(x_n, y_n)$, $P_{n+1}(x_{n+1}, y_{n+1})$ and $P_{n+2}(x_{n+2}, y_{n+2})$, the second program is forestalled and the control data is set to zero.

4. A computer system according to claim 2, wherein, in response to calculation of the rotation angle $\angle\theta_n$ $(=\angle P_n O_n P_{n+1})$ by the second program results in a determination that the rotation angle is an acute angle, the control data is set to zero.

5. A computer system according to claim 2, wherein, in response to location of the three sequential input points $P_n(x_n, y_n)$, $P_{n+1}(x_{n+1}, y_{n+1})$ and $P_{n+2}(x_{n+2}, y_{n+2})$ substantially in a line, the second program employs a value proportional to the displacement value between the points $P_n$ and $P_{n+1}$ as a rotation angle $\angle\theta_n$.

6. A coordinate input method for acquiring a control data concerning a location and a posture of a graphic model displayed on a screen by employing a coordinate value entered with a coordinate pointing device, comprising the steps of:

sequentially storing a coordinate value of an input point $P_i(x_i, y_i)$ entered by a coordinate pointing device (subscript "i" is a positive integer and indicates the number of inputs);

calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+2})$ (n is a positive integer);

calculating a rotation angle $\angle\theta_n(=\angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

employing the calculated rotation angle $\angle\theta_n$ as a control data; and wherein, when no displacement exists during the three sequential input points $P_n(x_n, y_n)$, $P_{n+1}(x_{n+1}, y_{n+1})$ and $P_{n+2}(x_{n+2}, y_{n+2})$, the step of calculating the rotation angle $\angle\theta_n(=\angle P_n O_n P_{n+1})$ is not performed and the control data is set to zero.

7. A coordinate input method for acquiring a control data concerning a location and a posture of a graphic model displayed on a screen by employing a coordinate value entered with a coordinate pointing device, comprising the steps of:

sequentially storing a coordinate value of an input point $P_i(x_i, y_i)$ entered by said coordinate pointing device (subscript "i" is a positive integer and indicates the number of inputs);

calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+2})$ (n is a positive integer);

calculating a rotation angle $\angle\theta_n(=\angle P_n O_n P_{n+1})$, which is indicated by the first two sequential input points $P_n(x_n, y_n)$ and $P_{n+1}(x_{n+1}, y_{n+1})$, in accordance with the central angle $\angle P_n O_n P_{n+2}$;

calculating a weighted average for the rotation angle $\angle\theta_n$, and one or more previously obtained rotation angles, $\angle\theta_{n-1}(=\angle P_{n-1} O_{n-1} P_n)$, $\angle\theta_{n-2}(=\angle P_{n-2} O_{n-2} P_{n-1})$, ...; and employing the averaged rotation angle $\angle(\theta_n)_{ave}$ as a control data.

8. The coordinate input method according to claim 7, wherein, when no displacement exists during the three sequential input points $P_n(x_n, y_n)$, $P_{n+1}(x_{n+1}, y_{n+1})$ and $P_{n+2}(x_{n+2}, y_{n+2})$, the step of calculating the rotation angle $\angle\theta_n(=\angle P_n O_n P_{n+1})$ is not performed and the control data is set to zero.

9. The coordinate input method according to claim 7, (wherein, in response to the step of calculating the rotation angle $\angle\theta_n$ $(=\angle P_n O_n P_{n+1})$ determining that the angle is an acute angle, the step of calculating the rotation angle $\angle\theta_n$ $(=\angle P_n O_n P_{n+1})$ is foregone, and the control data is set to zero.

10. The coordinate input method according to claim 7, wherein, when the three sequential input points $P_n(x_n, y_n)$, $P_{n+1}(x_{n+1}, y_{n+1})$ and $P_{n+2}(x_{n+2}, y_{n+2})$ are located almost in a line, the calculation of the rotation angle uses a value proportional to the displacement value between the points $P_n$ and $P_{n+1}$ as the rotation angle $\angle\theta_n$.

11. A computer system having a coordinate input capability and comprising:

a processor;

memory operatively coupled to the processor and storing data to be processed, the memory including a coordinate value of an input point $P_i(x_i, y_i)$ that is sequentially input by a coordinate pointing device (subscript "i" is a positive integer and indicates an input count);

a first program stored in the memory and executable on the processor to calculate a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+2})$, the coordinate value of the three sequential input points $P_n(x_n, y_n)$, $P_{n+1}(x_{n+1}, y_{n+1})$ and $P_{n+2}(x_{n+2}, y_{n+2})$ being stored in the memory (n is a positive integer);

a second program stored in the memory and executable on the processor to calculate a rotation angle $\angle\theta_n(=\angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

a third program stored in said memory and executable on said processor to employ the calculated rotation angle $\angle\theta_n$ as a control data; and wherein, in response to calculation of the rotation angle $\angle\theta_n$ $(=\angle P_n O_n P_{n+1})$ by the second program results in a determination that the rotation angle is an acute angle, the control data is set to zero.

12. A computer system having a coordinate input capability and comprising:

a processor;

memory operatively coupled to the processor and storing data to be processed, the memory including a coordinate value of an input point $P_i(x_i, y_i)$ that is sequentially input by a coordinate pointing device (subscript "i" is a positive integer and indicates an input count);

a first program stored in the memory and executable on the processor to calculate a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+})$, the coordinate value of the three sequential input points $P_n(x_n, y_n)$, $P_{n+1}(x_{n+1}, y_{n+1})$ and $P_{n+2}(x_{n+2}, y_{n+2})$ being stored in said memory (n is a positive integer);

a second program stored in the memory and executable on the processor to calculate a rotation angle $\angle\theta_n(=\angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

a third program stored in the memory and executable on the processor to employ the calculated rotation angle $\angle\theta_n$ as a control data; and wherein, in response to location of the three sequential input points $P_n(x_n, y_n)$, $P_{n+1}(x_{n+1}, y_{n+1})$ and $P_{n+2}(x_{n+2}$ $y_{n+2}$) in a line, the second program employs a value proportional to the displacement value between the points $P_n$ and $P_{n+1}$ as a rotation angle $\angle \theta_n$.

13. A coordinate input method for acquiring a control data concerning a location and a posture of a graphic model displayed on a screen by employing a coordinate value entered with a coordinate pointing device, comprising the steps of:

sequentially storing a coordinate value of an input point $P_i(x_i, y_i)$ entered by a coordinate pointing device (subscript "i" is a positive integer and indicates the number of inputs);

calculating a central angle $\angle P_n O_n P_{+2}$ relative to an arc $P_n P_{n+1}, P_{n+2}$ of a circle $O_n$ circumscribed about three sequential input points $P_n(x_n, y_n)$; $P_{n+1}(x_{n+1}, y_{n+1})$ and $P_{n+2}(x_{n+2}, y_{n+2})$ (n is a positive integer);

calculating a rotation angle $\phi \theta_n (= \angle P_n O_n P_{n+1})$, which is indicated by the two sequential input points $P_n(x_n, y_n)$ and $P_{n+1}(x_{n+1}, y_{n+1})$, in accordance with the central angle $\angle P_n O_n P_{n+2}$;

employing the calculated rotation angle $\angle \theta_n$ as a control data; and wherein, in response to the step of calculating the rotation angle $\angle \theta_n (= \angle P_n O_n P_{n+1})$ determining that the angle is an acute angle, the step of calculating the rotation angle $\angle \theta_n (= P_n O_n P_{n+1})$ is foregone, and the control data is set to zero.

14. A coordinate input method for acquiring a control data concerning a location and a posture of a graphic model displayed on a screen by employing a coordinate value entered with a coordinate pointing device, comprising the steps of:

sequentially storing a coordinate value of an input point $P_i(x_i, y_i)$ entered by a coordinate pointing device (subscript "i" is a positive integer and indicates the number of inputs);

calculating a central angle $\angle P_n O_n P_{n+2}$ relative to an arc $P_n P_{n+1} P_{n+2}$ of a circle $O_n$ circumscribed about three sequential input points $P_n(x_n, y_n)$, $P_{n+1}(x_{n+1}, y_{n+1})$ and $P_{n+2}(x_{n+2}, y_{n+2})$ (n is a positive integer);

calculating a rotation angle $\angle \theta_n (= \angle P_n O_n P_{n+1})$, which is indicated by the two sequential input points $P_n(x_n, y_n)$ and $P_{n+1}(x_{n+1}, y_{n+1})$ in accordance with the central angle $\angle P_n O_n P_{n+2}$;

employing the calculated rotation angle $\angle \theta_n$ as a control data; and, wherein, when the three sequential input points $P_n(x_n, y_n)$, $P_{n+1}(x_{n+1}, y_{n+1})$ and $P_{n+2}(x_{n+2}, y_{n+2})$ are located almost in a line, the calculation of the rotation angle uses a value proportional to the displacement value between the points $P_n$ and $P_{n+1}$ as the rotation angle $\angle \theta_n$.

* * * * *